United States Patent
Purin

(10) Patent No.: US 9,579,562 B2
(45) Date of Patent: Feb. 28, 2017

(54) PRISM CODE

(71) Applicant: Charlotte M Purin, Venice, CA (US)

(72) Inventor: Charlotte M Purin, Venice, CA (US)

( * ) Notice: Subject to any disclaimer, the term of this patent is extended or adjusted under 35 U.S.C. 154(b) by 0 days.

(21) Appl. No.: 13/964,097

(22) Filed: Aug. 11, 2013

(65) Prior Publication Data
US 2014/0080596 A1    Mar. 20, 2014

Related U.S. Application Data

(60) Provisional application No. 61/682,306, filed on Aug. 13, 2012.

(51) Int. Cl.
*H04L 9/00*    (2006.01)
*A63F 13/30*   (2014.01)
*A63F 13/80*   (2014.01)
*G06F 21/64*   (2013.01)
*G06F 21/60*   (2013.01)
*G06F 17/22*   (2006.01)

(52) U.S. Cl.
CPC .............. *A63F 13/12* (2013.01); *A63F 13/80* (2014.09); *G06F 17/2217* (2013.01); *G06F 21/60* (2013.01); *G06F 21/602* (2013.01); *G06F 21/64* (2013.01)

(58) Field of Classification Search
None
See application file for complete search history.

(56) References Cited

U.S. PATENT DOCUMENTS

2007/0180230 A1*  8/2007  Cortez ........................... 713/156
2010/0017890 A1*  1/2010  Tucker et al. ................... 726/28
2013/0067225 A1*  3/2013  Shochet et al. ................ 713/165

OTHER PUBLICATIONS ePeterso2, Puzzle Solving 101—Lesson 7: Cryptography, Aug. 21, 2007, http://www.geocaching.com/geocache/GCYXZ7_puzzle-solving-101-lesson-7-cryptography?guid=395a56a3-61b4-4c29-b413-69374d4c2565.*
Wikipedia, Substitution cipher, Jun. 10, 2011, http://en.wikipedia.org/wiki/Substitution_cipher.*
Wikipedia, Code talkers, Mar. 11, 2012, http://en.wikipedia.org/wiki/Code_talker.*

* cited by examiner

*Primary Examiner* — Jason Yen
(74) *Attorney, Agent, or Firm* — Edwin P. Tarver; Lauson & Tarver LLP

(57) ABSTRACT

Coding and decoding words formed of alphanumeric characters, in which a listing of symbols are provided, each symbol being associated with a different alphanumeric character, converted and transmitted to another who has the listing of symbols, (the symbols may be different colors icons, or sounds), each associated with a different alphanumeric character.

3 Claims, 30 Drawing Sheets

ALPHANUMERIC CHARACTERS ARE INPUT, (SENT), BUT SYMBOLS ARE RECEIVED BY THE RECIPIENT, AND TRANSLATED.

ADDITIONAL SAMPLE SYMBOL ALPHABETS CALLED: 'ALIEN', 'EGYPTIAN', & 'GIRL'
1 - 'ALIEN' SYMBOL ALPHABET
THESE SYMBOLS TRANSLATE AS 'OLA' IN SPANISH:
2 - 'EGYPTIAN' SYMBOL ALPHABET:
THESE SYMBOLS TRANSLATE AS 'HELLO' IN ENGLISH:
3 - 'GIRL' SYMBOL ALPHABET:
THESE SYMBOLS TRANSLATE AS 'BONJOUR' IN FRENCH:

PRISM CODE, BY: CHARLOTTE M. PURIN, 8-11-2013

DECIPHER PAGE KEY TO COLOR SYMBOL ALPHABET

| | | | | |
|---|---|---|---|---|
| M | 090 | N | F9C | |
| L | *F00* | Y | 999 | |
| K | C9F | X | CF9 | |
| J | C66 | W | 960 | |
| I | 09F | V | *F0F* | |
| H | *000* | U | C0F | |
| G | 9F0 | T | FFC | |
| F | F63 | S | *00F* | |
| E | F90 | R | CF0 | |
| D | 930 | Q | 630 | |
| C | 9FF | P | CFF | |
| B | 036 | O | *FF0* | |
| A | 660 | N | 90F | |

000
SPACE SYMBOL

| S | *F00* |
|---|---|
| C | *FF0* |
| H | *FF0* |
| O | *000* |
| O | 9FF |
| L | *00F* |

| A | CF0 |
|---|---|
| F | F90 |
| T | FFC |
| E | F63 |
| R | 660 |

| M | FFC |
|---|---|
| E | F90 |
| E | F90 |
| T | 090 |

| U | C0F |
|---|---|
| L | F90 |
| O | *F0F* |
| V | *FF0* |
| E | F00 |

| I | 09F |

ALPHANUMERIC CHARACTERS ARE INPUT, (SENT), BUT SYMBOLS
ARE RECEIVED BY THE RECIPIENT, AND TRANSLATED.

ADDITIONAL SAMPLE SYMBOL ALPHABETS CALLED: 'ALIEN', 'EGYPTIAN', & 'GIRL'
1 - 'ALIEN' SYMBOL ALPHABET

A B C D E F G H I J K L M N O P Q R S T U V W X Y Z

THESE SYMBOLS TRANSLATE AS 'OLA' IN SPANISH:

2 - 'EGYPTIAN' SYMBOL ALPHABET:

A B C D E F G H I J K L M N O P Q R S T U V W X Y Z

THESE SYMBOLS TRANSLATE AS 'HELLO' IN ENGLISH:

3 - 'GIRL' SYMBOL ALPHABET:

A B C D E F G H I J K L M N O P Q R S T U V W X Y Z

THESE SYMBOLS TRANSLATE AS 'BONJOUR' IN FRENCH:

PRISM CODE, BY: CHARLOTTE M. PURIN, 8-11-2013

*Fig. 3*

Color table   PRISM CODE-216WEB SAFE COLOR CHART (FOR REFERENCE)

| *000* | 300 | 600 | 900 | C00 | *F00* |
|---|---|---|---|---|---|
| *003* | 303 | 603 | 903 | C03 | *F03* |
| 006 | 306 | 606 | 906 | C06 | F06 |
| 009 | 309 | 609 | 909 | C09 | F09 |
| 00C | 30C | 60C | 90C | C0C | F0C |
| *00F* | 30F | 60F | 90F | C0F | *F0F* |
| 030 | 330 | 630 | 930 | C30 | F30 |
| 033 | 333 | 633 | 933 | C33 | F33 |
| 036 | 336 | 636 | 936 | C36 | F36 |
| 039 | 339 | 639 | 939 | C39 | F39 |
| 03C | 33C | 63C | 93C | C3C | F3C |
| 03F | 33F | 63F | 93F | C3F | F3F |
| 060 | 360 | 660 | 960 | C60 | F60 |
| 063 | 363 | 663 | 963 | C63 | F63 |
| 066 | 366 | 666 | 966 | C66 | F66 |
| 069 | 369 | 669 | 969 | C69 | F69 |
| 06C | 36C | 66C | 96C | C6C | F6C |
| 06F | 36F | 66F | 96F | C6F | FGF |
| 090 | 390 | 690 | 990 | C90 | F90 |
| 093 | 393 | 693 | 993 | C93 | F93 |
| 096 | 396 | 696 | 996 | C96 | F96 |
| 099 | 399 | 699 | 999 | C99 | F99 |
| 09C | 39C | 69C | 99C | C9C | F9C |
| 09F | 39F | 69F | 99F | C9F | F9F |
| 0C0 | 3C0 | 6C0 | 9C0 | CC0 | FC0 |
| 0C3 | 3C3 | 6C3 | 9C3 | CC3 | FC3 |
| 0C6 | 3C6 | 6C6 | 9C6 | CC6 | FC6 |
| 0C9 | 3C9 | 6C9 | 9C9 | CC9 | FC9 |
| 0CC | 3CC | 6CC | 9CC | CCC | FCC |
| 0CF | 3CF | 6CF | 9CF | CCF | FCF |
| *0F0* | 3F0 | *6F0* | 9F0 | CF0 | *FF0* |
| 0F3 | *3F3* | *6F3* | 9F3 | CFC | *FF3* |
| *0F6* | *3F6* | 6F6 | 9F6 | *CF6* | *FF6* |
| 0F9 | 3F9 | 6F9 | 9F9 | CF9 | FF9 |
| *0FC* | *3FC* | 6FC | 9FC | CFC | FFC |
| *0FF* | *3FF* | *6FF* | 9FF | CFF | *FFF* |

*Fig. 4*

User Registration

HOME

Member Name
[starsee]

Password
[........]

Confirm Password
[........]

Email
[charlotte@]

[Login]

By registering on this site you confirm you are age 13 or over and you agree to our Terms and Guidlines

*Enable Cookies

*Fig. 8* starseed's Inbox

INBOX  AVATARS  COMPOSE  HOW TO PLAY  CALCULATOR  DELETE  EXPLODOGRAM  LEADERBOARD  LOG OUT  MASS EXPLODOGRAM  MASS EMAIL

TO:

SUBJECT:

(Send)

| | From | Subject | Date | |
|---|---|---|---|---|
| ☐ | starseed | REPLY TO MESSAGE | 2013-08-08 14:37:00 | |
| ☐ | starseed | COMPOSE A MESSAGE | 2013-08-08 14:32:00 | |
| ☐ | starseed | REPLY TO SENDER | 2013-08-06 19:00:00 | |
| ☐ | starseed | Patent - How to play | 2013-08-06 18:58:00 | |
| ☐ | starseed | REPLY TO SENDER | 2013-08-06 18:56:00 | |
| ☐ | starseed | Patent-How to Play | 2013-08-06 18:54:00 | |
| ☐ | starseed | Patent - How to Play | 2013-08-06 18:53:00 | |
| ☐ | starseed | How to play Explodogram | 2013-08-06 08:47:00 | |
| ☐ | starseed | Patent-How to Play | 2013-08-06 08:38:00 | |
| ☐ | starseed | Patent - How to Play | 2013-08-06 08:34:00 | |
| ☐ | D-Train | explodograms?? | 2013-07-18 19:05:00 | |
| ☐ | D-Train | check it | 2013-07-18 19:02:00 | |
| ☐ | D-Train | check it | 2013-07-18 18:55:00 | SOLVED |

*Fig. 17*

Prism Code LeaderBoard
INBOX   AVATARS   HOW TO PLAY   CALCULATOR   EXPLODOGRAM   LOG OUT

Monthly Winners Receive AMC Theatre Gift Card

MASTER EXPLODER: starseed (554)
THIS MONTH'S WINNER: starseed (247)
MY SCORE: (554)

| WEEK | RANK | PLAYER | SCORE |
|---|---|---|---|
| Aug. 4-Aug.10 | 1 | starseed | 1 |

| MONTH | RANK | PLAYER | SCORE |
|---|---|---|---|
| August | 1 | starseed | 1 |
| July | 1 | D-Train | 130 |
|  | 2 | starseed | 76 |
| April | 1 | starseed | 11 |
|  | 2 | D-Train | 5 |
| March | 1 | D-Train | 60 |
|  | 2 | starseed | 48 |
| February | 1 | starseed | 171 |

MASTER DECODER: D-Train (1741)
THIS MONTH'S WINNER: starseed (43)
MY SCORE: (353)

| WEEK | RANK | PLAYER | SCORE |
|---|---|---|---|
| Aug.4-Aug.10 | 1 | starseed | 42 |

| WEEK | RANK | PLAYER | SCORE |
|---|---|---|---|
| August | 1 | starseed | 42 |
| July | 1 | D-Train | 55 |
|  | 2 | starseed | 10 |
| May | 1 | D-Train | 325 |
|  | 2 | starseed | 5 |
| April | 1 | D-Train | 348 |
|  | 2 | starseed | 6 |
| March | 1 | D-Train | 946 |

*Fig. 22*

PRISM CODE

CROSS-REFERENCE TO RELATED APPLICATIONS

This application claims the benefit of Provisional Patent Application No. 61/682306, filed Aug. 13, 2012.

FIELD OF INVENTION

The invention relates to a method for coding and decoding alphanumeric characters and generally relates to computer programs and games.

BACKGROUND OF INVENTION

The invention is named Prism Code because when a user sends white light into a prism, the prism converts the white light and transmits out light that looks different than what was input. White light is sent into a prism, but red, orange, yellow, green, blue, and violet colors transmit out. Similarly, when a user sends an alphanumeric message via Prism Code, Prism Code converts the alphanumeric message and transmits out a message that looks different than what was input. It becomes a message comprised of symbols, colors and/or sounds.

In contrast to other methods, (e.g. Morse code), Prism Code is unique. A Morse code user inputs, (sends) a message (e.g. -.-), and the same message, (-.-) transmits out. Prism Code is different than standard, well known, email clients, (e.g. AOL®, GMAIL®). When a user inputs, (sends), an email message such as, 'Hello' using standard email clients, the same exact 'Hello' transmits out and is viewed by the recipient. With Prism Code, when a user inputs, (sends), the message 'Hello', a different looking message transmits out. What is viewed by the recipient is not what was sent. Instead of seeing, 'Hello', the recipient sees symbols, that when decoded, translate as 'Hello'.

BRIEF SUMMARY OF INVENTION

The present invention, Prism Code, provides a computer program, method, and a game comprising of coding and decoding words formed of alphanumeric characters, in which a listing of symbols are provided, each symbol being associated with a different alphanumeric character, converted and transmitted to another who has the listing of symbols, (or knows them), each associated with a different alphanumeric character. The symbols may be different colors, icons, sounds, or a combination thereof.

The present computer game, Prism Code, can be played or viewed on computers or mobile devices such as laptops, smart phones, tablets, IPADS®, etc. Prism Code replaces the letters, numbers, and arithmetic characters of the English alphabet with color, rectangle and square shape symbols, although most other shape/symbols could be used, e.g. star, heart, skull, etc. Each character has its own distinct color and/or shape/symbol. There are twenty-six different symbols, one for each letter of the English alphabet, ten different symbols for numbers 0-9, and six different symbols for arithmetic characters, +, −, ×, =, decimal, and divide.

The Prism Code method may also be used for Russian, but instead of inputting alphanumeric English alphabet characters, one would input Russian alphanumeric characters. The same output symbols used with the English alphabet can be used as output symbols for the Russian.

The basic computer program for email clients are well known, (e.g. AOL, Yahoo, etc.). Prism Code's email message game uses the same well known coding, however, Prism Code's method converts a sent message that has been composed using alphanumeric characters, into symbols for the recipient of the message to translate. The present online game can be found at www.prismcode.com and may be used for a demonstration of how the Prism Code computer program and method works.

Prism Code can also be utilized in other types of games. For example, the letters and numbers on each tile piece used in SCRABBLE® can be replaced with the associated Prism Code color and, or symbols. Similarly, the game app, WORDS WITH FRIENDS® could become 'Colors With Friends', adding the element of decoding. For a challenge, the popular FORTUNE COOKIE® app can be replaced with Prism Code method, (e.g., becoming a game called 'Decoder Cookie'), or even a physical fortune cookie can have its paper message printed in Prism Code's symbols.

BRIEF DESCRIPTION OF DRAWINGS:

FIG. 3 shows decipher code keys for translating letters into graphic symbol alphabets.

FIG. 4 shows a color code table of the 216 standard Web-Safe color codes.

FIG. 8 shows a registration screen for playing a decoding game using Prism Code.

FIG. 17 shows an inbox bearing a highlighted message.

FIG. 22 shows a Prism Code leader board identifying high-scoring users.

DETAILED DESCRIPTION OF HOW TO USE THE INVENTION

How to use the Prism Code invention on computers or mobile devices such as smart phones, laptops, tablets, IPADS®, etc:

The Prism Code game can only be played with others that have joined/become a Prism Code member, (or with oneself after joining Prism Code). The idea is to memorize the symbols and start communicating with others in the symbol language.

Figure 1:
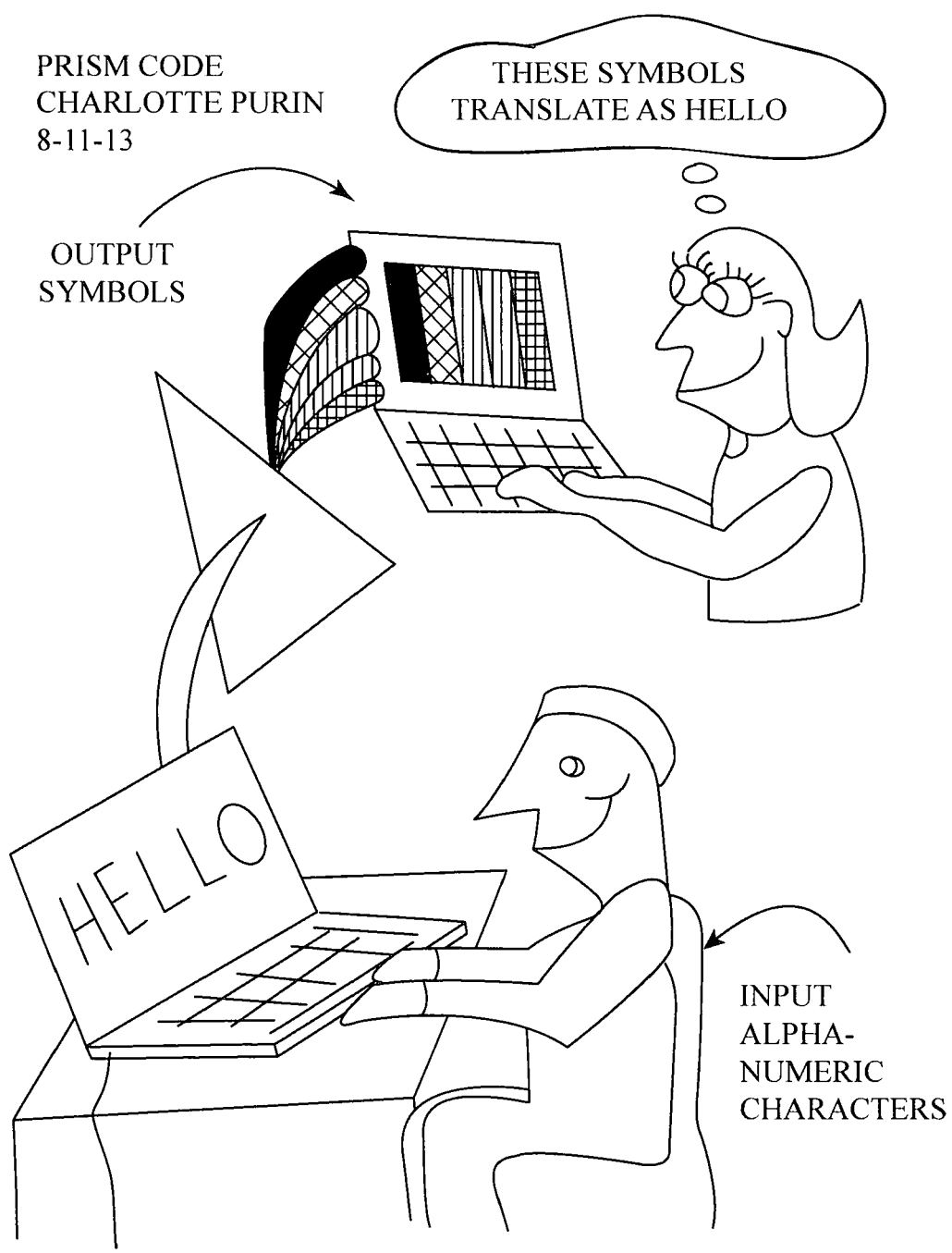
FIG. 1 shows two computer users communicating via Prism Code.
Figure 2:
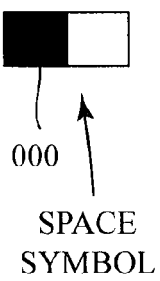
FIG. 2 shows an alphabet decipher key for translating letters to standardized website color codes.
Figure 5:
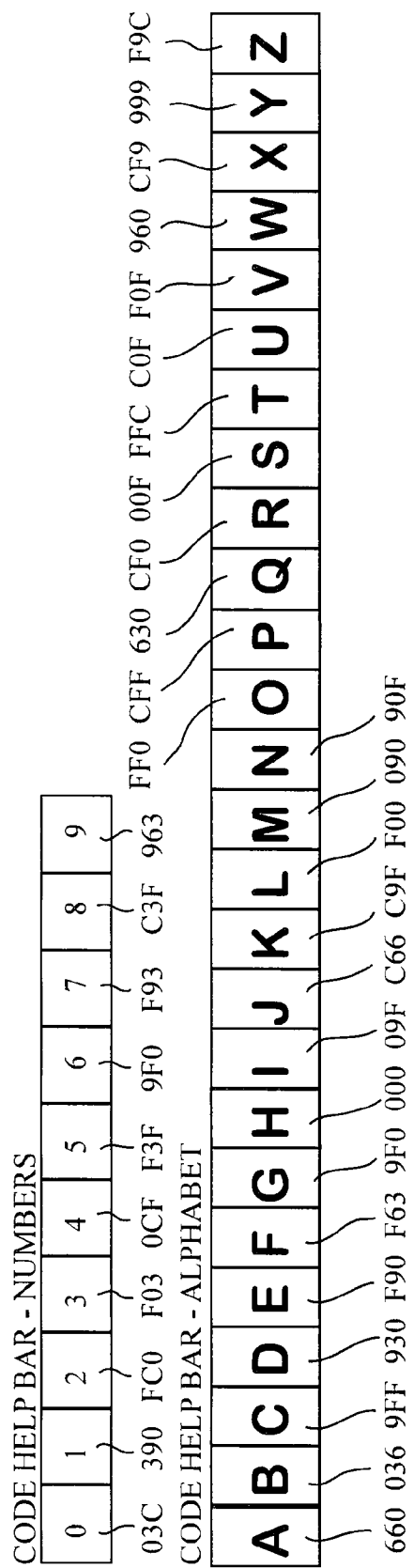
FIG. 5 shows a decipher code key for translating letters and numbers into Web-Safe color codes.
Figure 6:
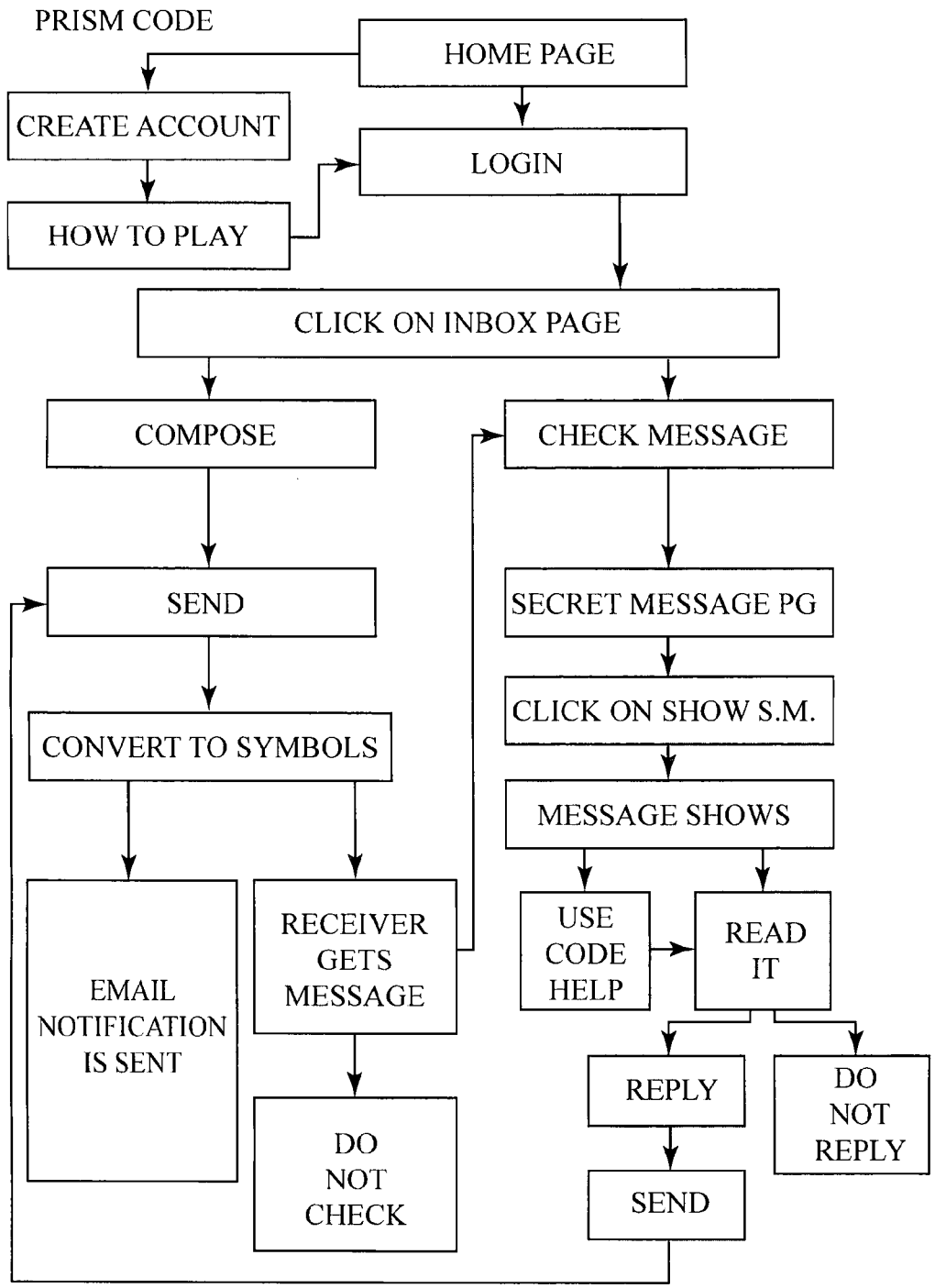
FIG. 6 shows a flow chart for playing an online message game using Prism Code.
Figure 7:
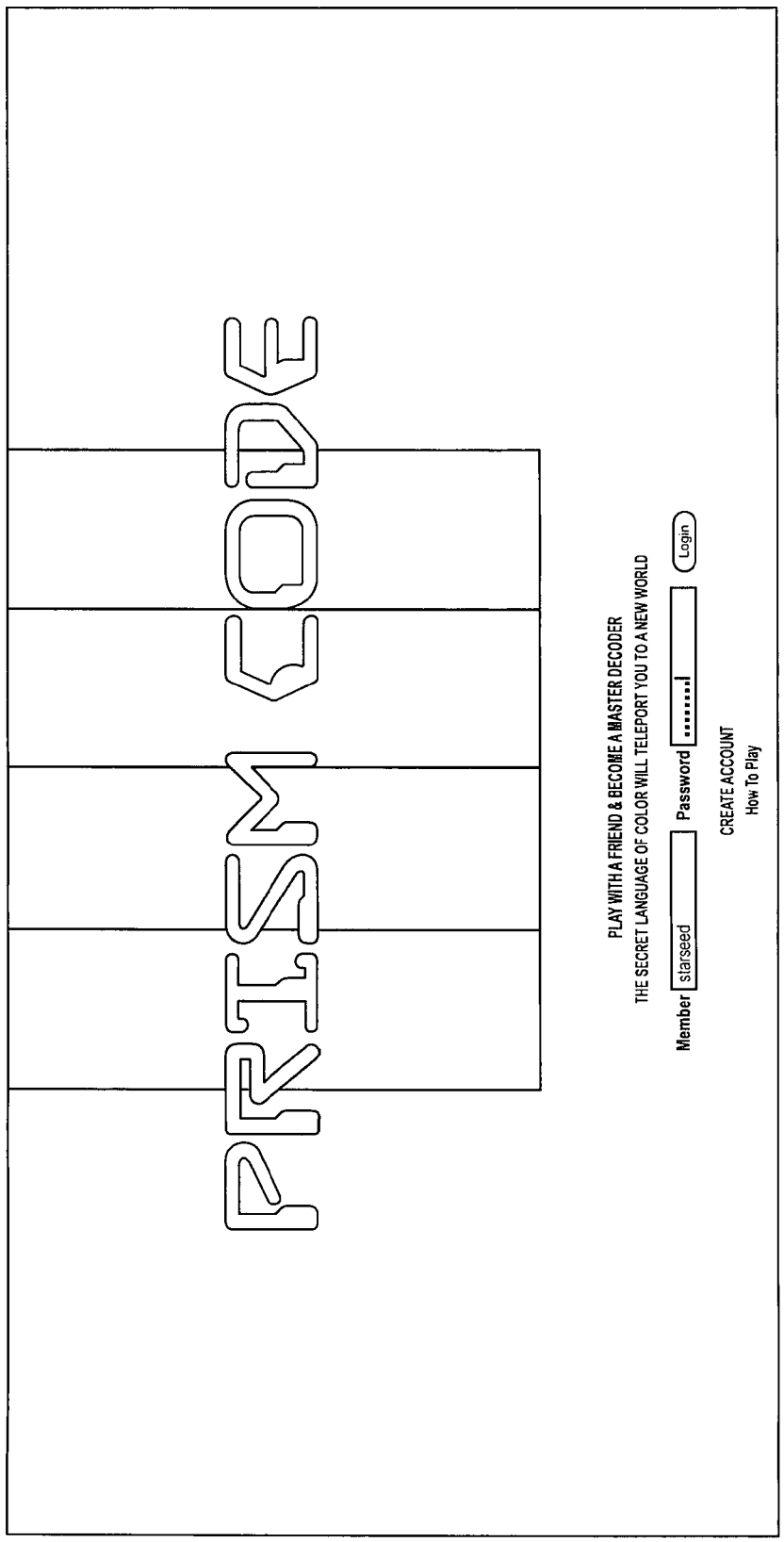
FIG. 7 shows a screen for playing a decoding game using Prism Code.

Referring to FIGS. 7-22:

FIG. 7—Home Page: Click on CREATE ACCOUNT and become a member, or if user is already a member, fill in username, password, and click on login.

FIG. 8—Create New Account: To create a new Prism Code account choose a username and password, enter an email address, agree to the terms, and enable cookies.

Figure 9:
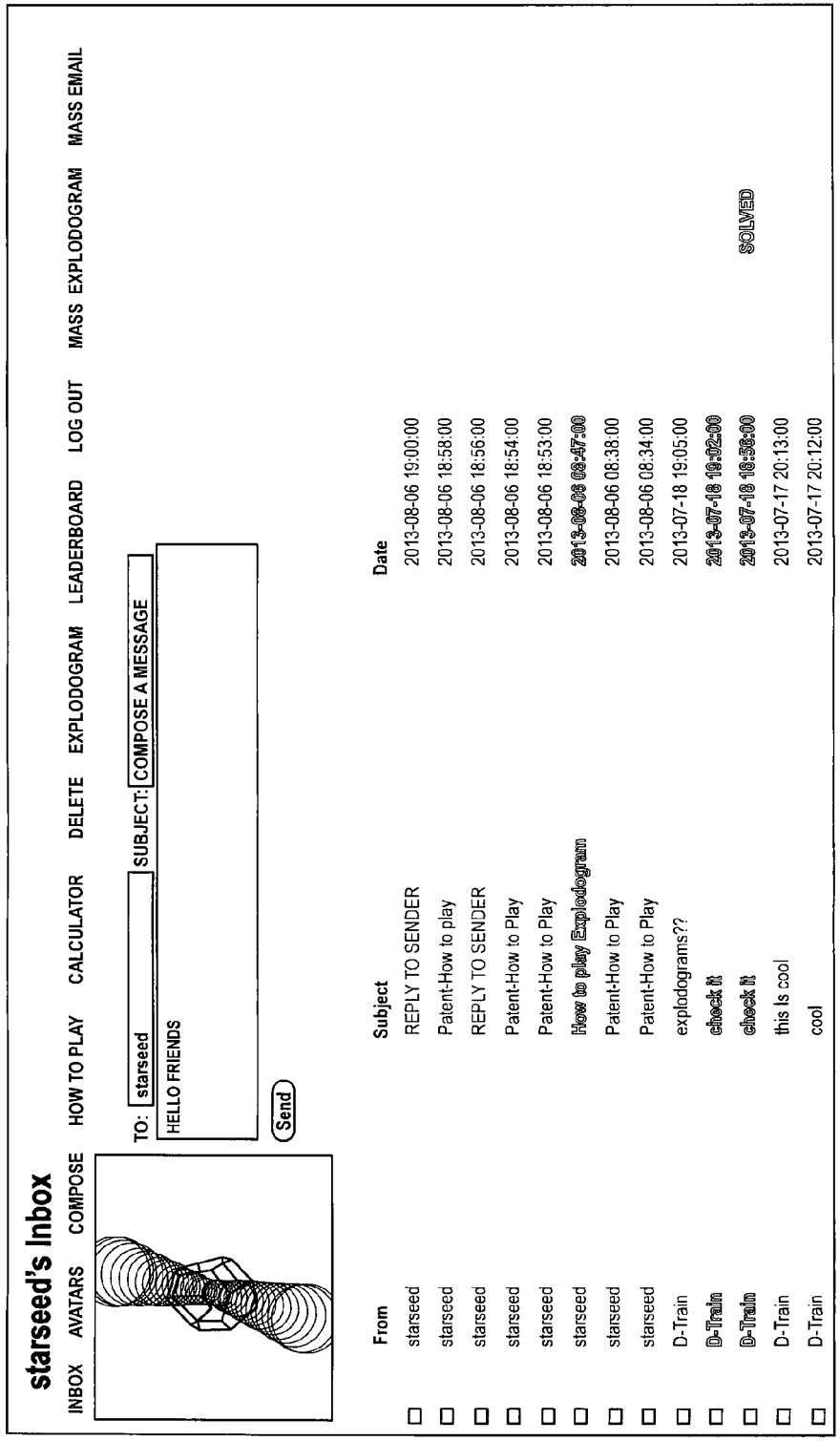
FIG. 9 shows a user's inbox for playing a decoding game using Prism Code.

FIG. 9—Inbox-Compose Message: To compose a message the user clicks on INBOX at the top of the page. Type a message, using the English alphabet, into the white compose box area. The message in the screen shot reads, 'HELLO FRIENDS'. Click 'send' to send a message.

Figure 10:
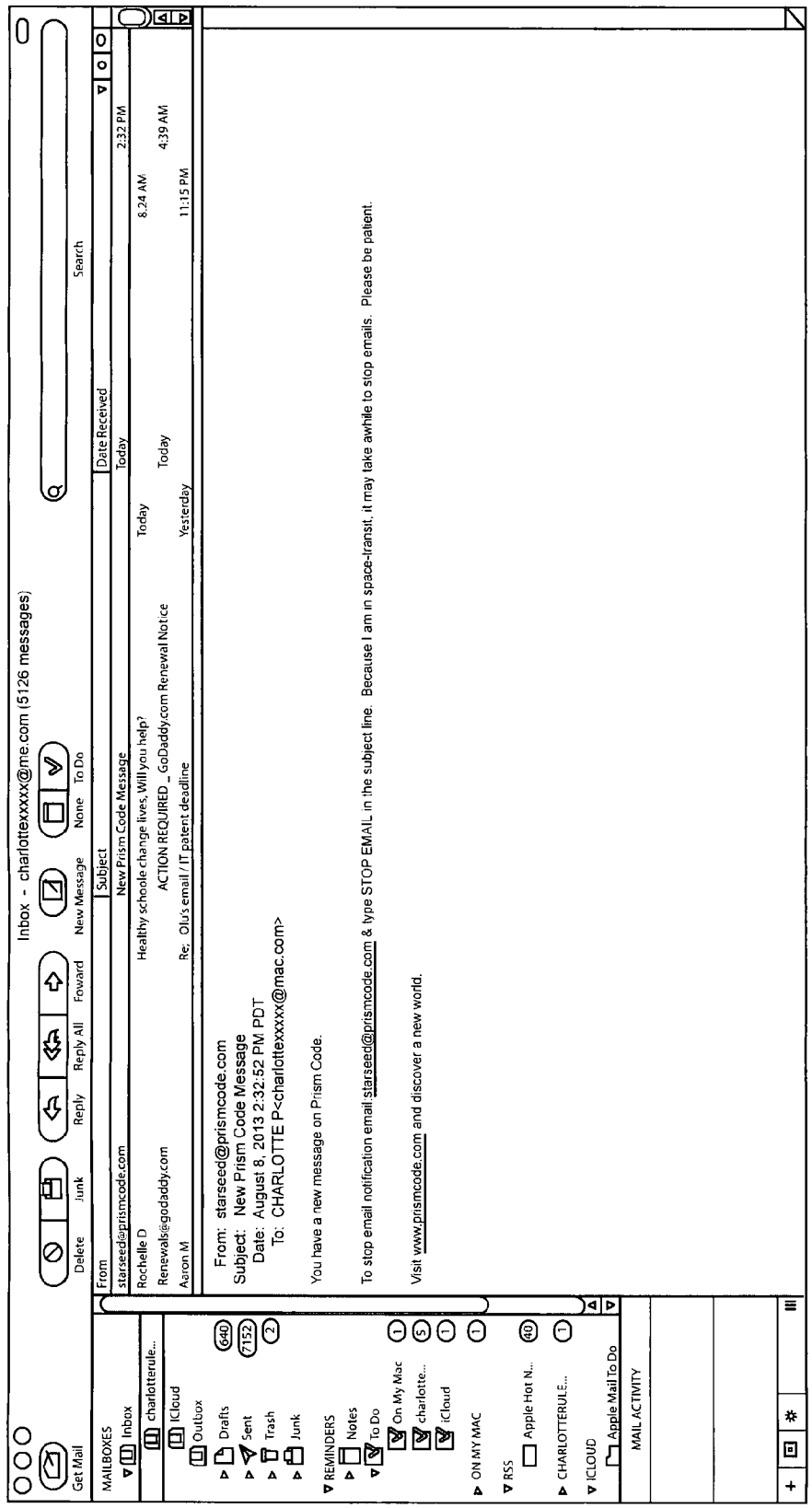
FIG. 10 shows a message screen bearing a notification email message.

FIG. 10—Receiver is Notified: The receiver of the newly sent message will get a 'you have a new message' email notification sent to the email they inputted when they registered with Prism Code and created their account.

Figure 11:
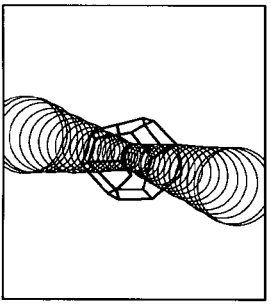
FIG. 11 shows an inbox bearing a highlighted message.

FIG. 11—Inbox to Retrieve message: The recipient of a new message goes to their inbox and clicks on the high-lighted message. The high-lighted messages have not been read.

Figure 12:
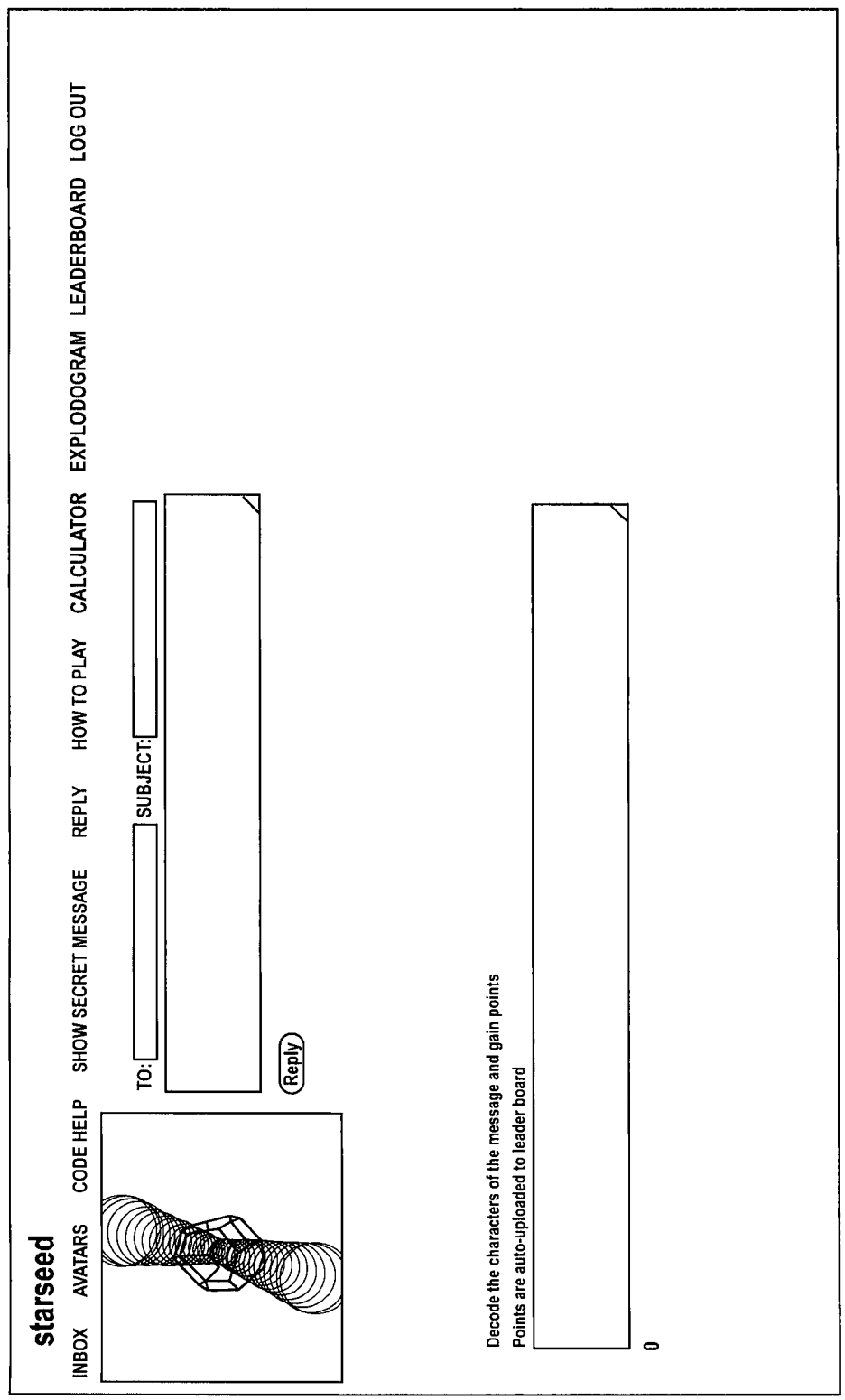
FIG. 12 shows a show secret message page of the Prism Code game.

FIG. 12—Taken to Secret message Page: After user clicks on the high-lighted message, user is taken to the SECRET MESSAGE PAGE. (The message is not visible just yet).

Figure 13:
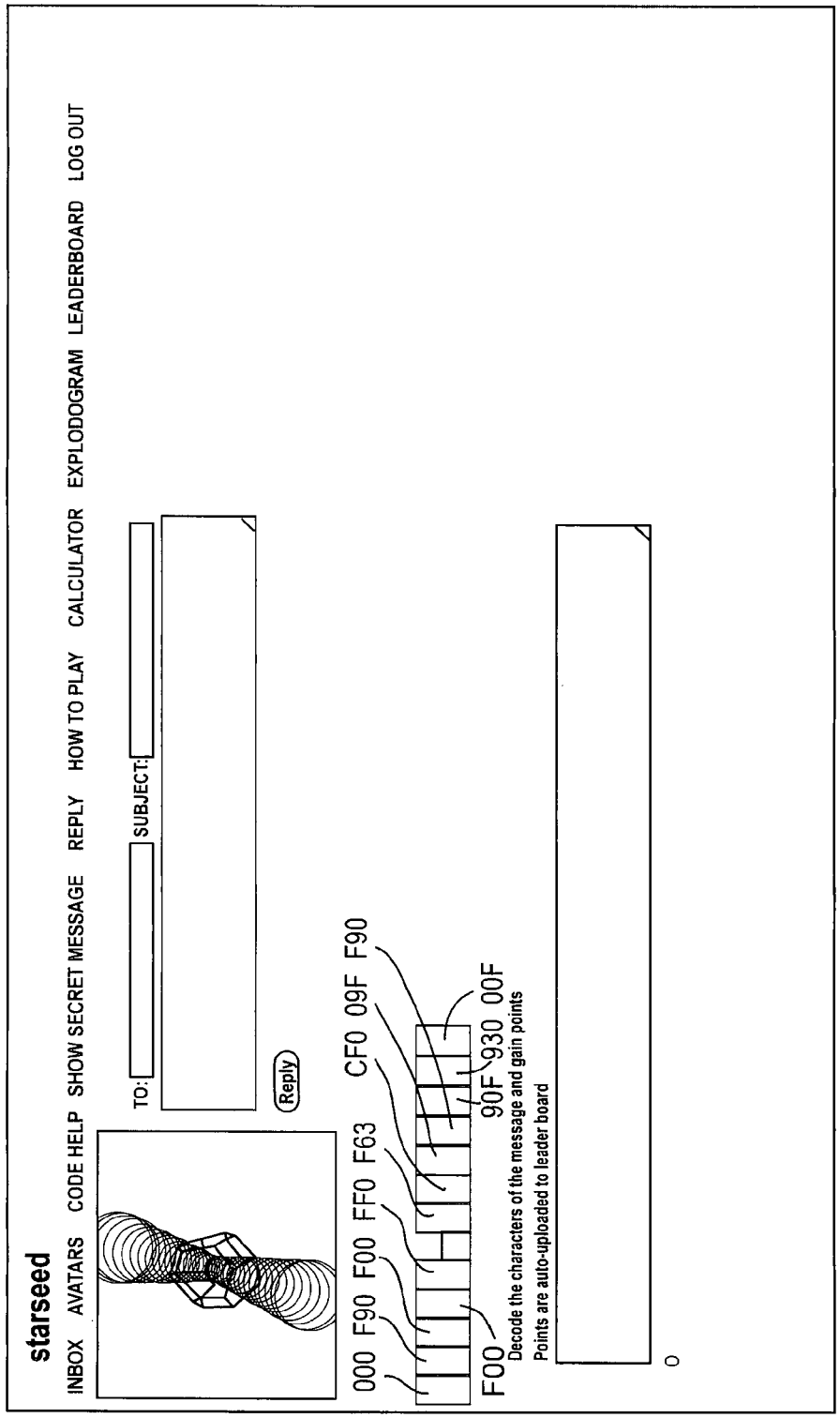
FIG. 13 shows a show secret message page of the Prism Code game bearing a symbol message.

FIG. 13—Click on Show Secret Message: Click on SHOW SECRET MESSAGE at the top of the page, and the color, symbol message becomes visible. This screen shot shows the color, rectangle symbols on the left side of the page. (They translate as, 'HELLO FRIENDS').

Figure 14:
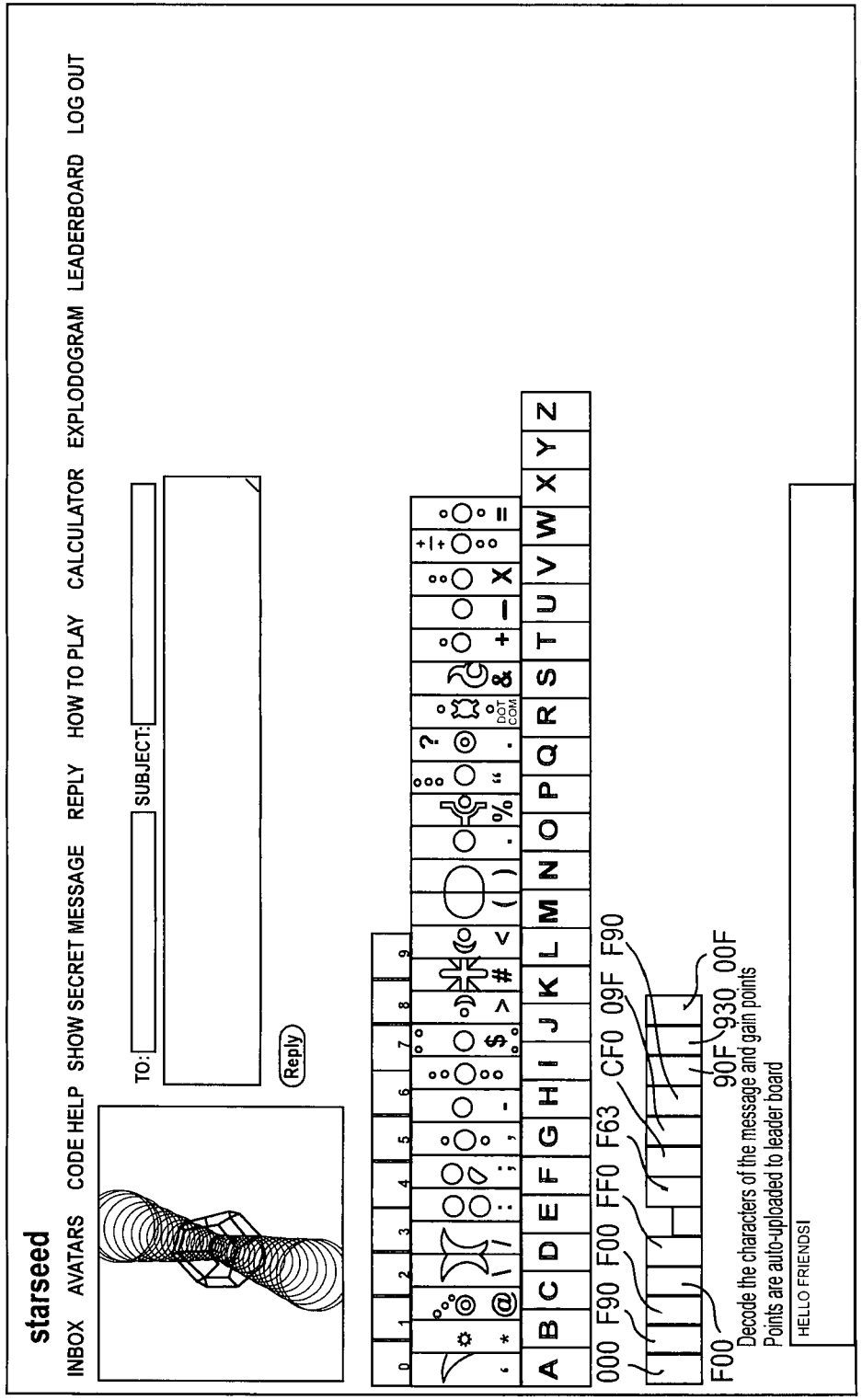
FIG. 14 shows a help decoding key table for identifying symbols of a coded Prism Code message.

FIG. 14—Click Code Help: If user has not memorized the symbols or needs help in translating, user may click on CODE HELP and the alphanumeric decipher key bars become visible. (The punctuation decipher key bar is under the numeric decipher key bar and above the alphabet decipher key bar). Number color codes are: 0—03C, 1—390, 2—FC0, 3—F03, 4—0CF, 5—F3F, 6—9F0, 7—F93, 8—C3F, 9—963. Alphabet letter color codes are: A—660, B—036, C—9FF, D—930, E—F90, F—F63, G—9F0, H—000, I—09F, J—C66, K—C9F, L—F00, M—090, N-90F, O—FF0, P—CFF, Q—630, R—CF0, S—00F, T—FFC, U—C0F, V—F0F, W—960, X—CF9, Y—999, and Z—F9C.

Figure 15:
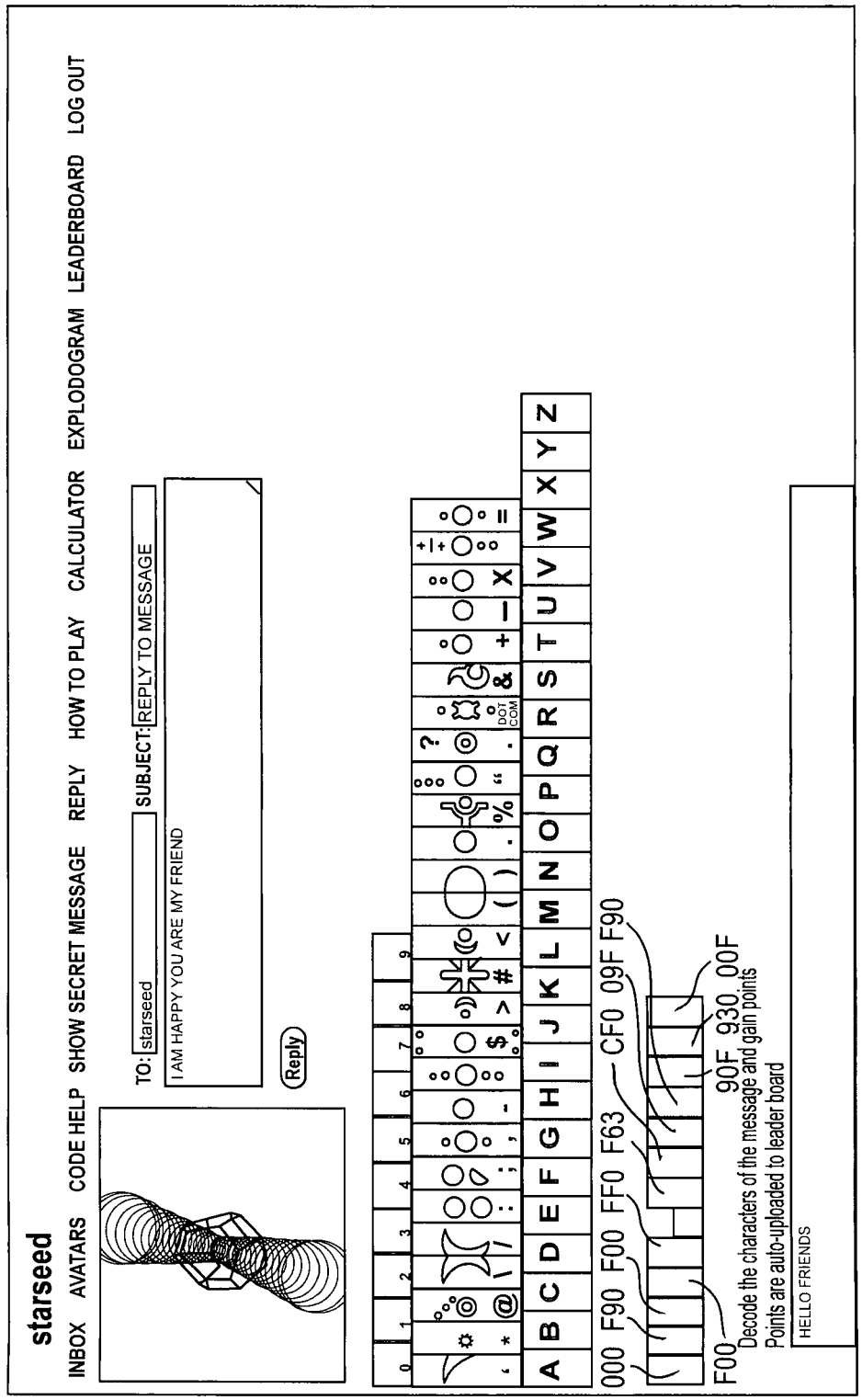
FIG. 15 shows a message page for replying to a coded Prism Code message.

FIG. 15—Reply To Sender: Fill in TO and SUBJECT boxes and type the reply to the sender in the white compose box, using the English alphabet. The reply in this screen shot reads, 'I AM HAPPY YOU ARE MY FRIEND'. Click on 'send' to send message.

Figure 16:
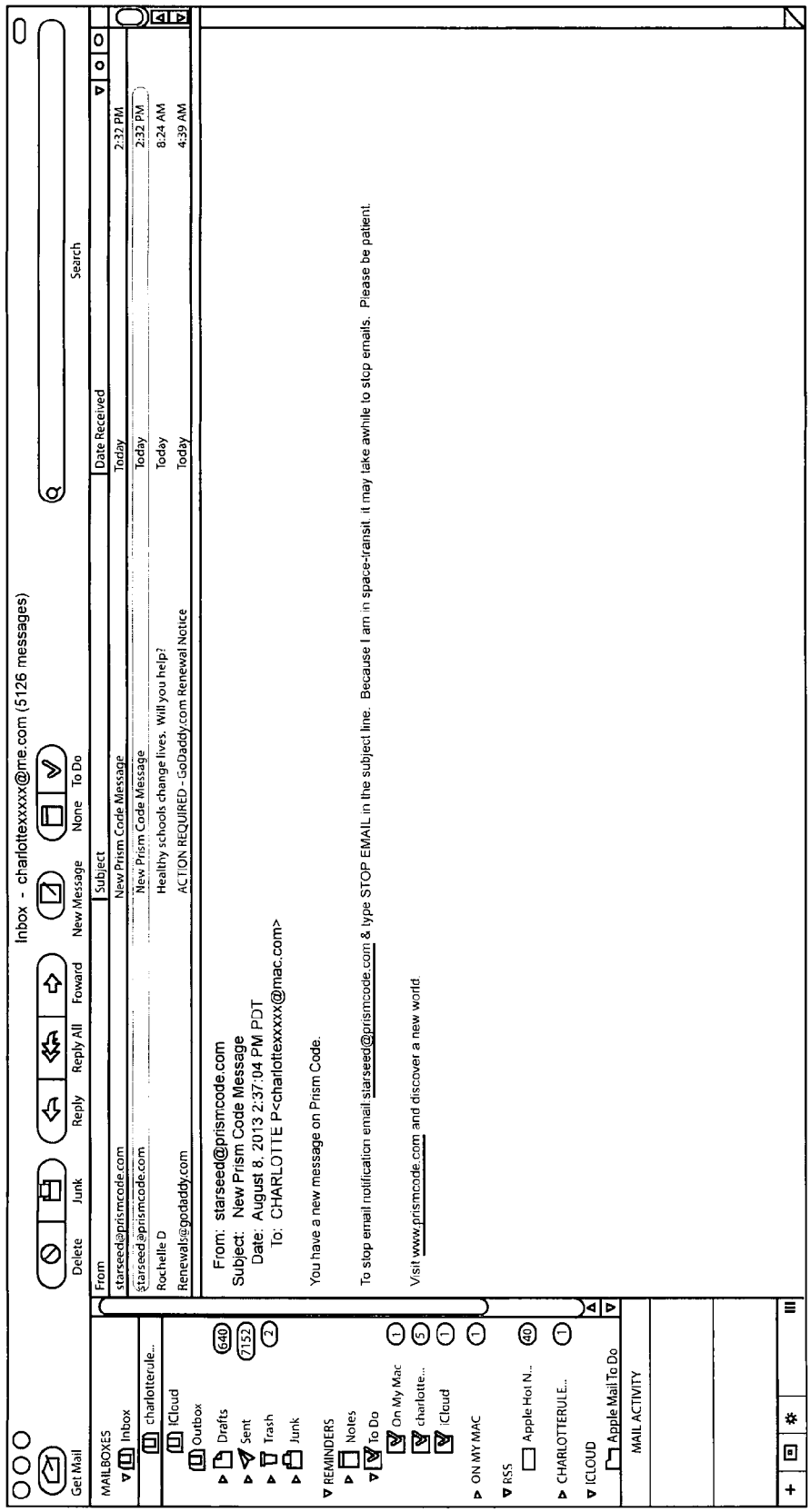
FIG. 16 shows a message screen bearing a notification email message.

FIG. 16—Receiver Gets Notified: The receiver of a new message will get an email notification sent to the email address used when they registered with Prism Code. This screen shot shows what that email notification can look like, (for a user with a MAC® or ICLOUD® email).

FIG. 17—Inbox-Click on High-Lighted Message: Receiver of the sent message goes to their inbox and clicks on the new, high-lighted message to open it.

Figure 18:
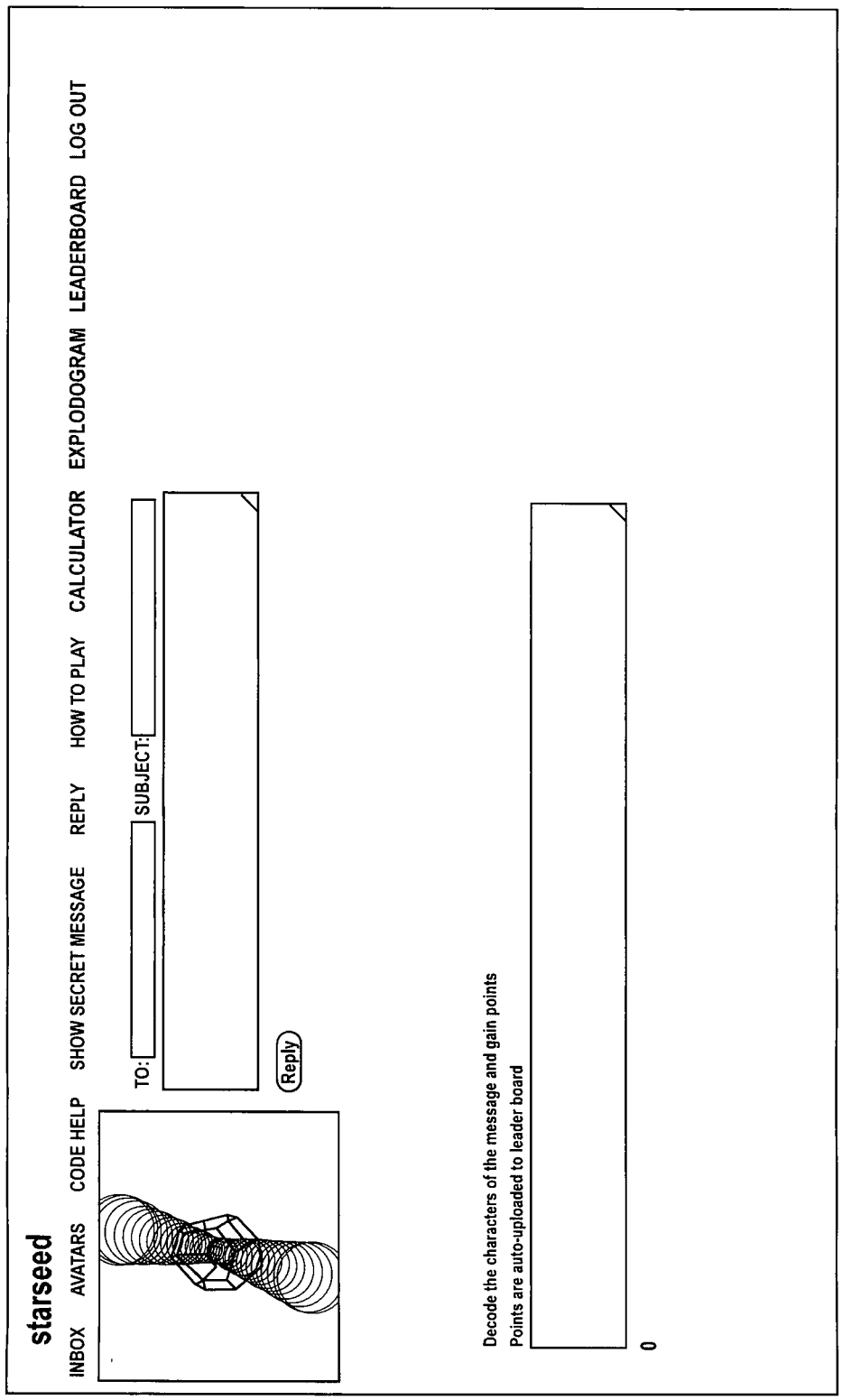
FIG. 18 shows a message screen for the recipient of a secret message.

FIG. 18—Taken to Secret Message Page: Upon clicking on the new, high-lighted message user is taken to the SECRET MESSAGE/recipient page.

Figure 19:
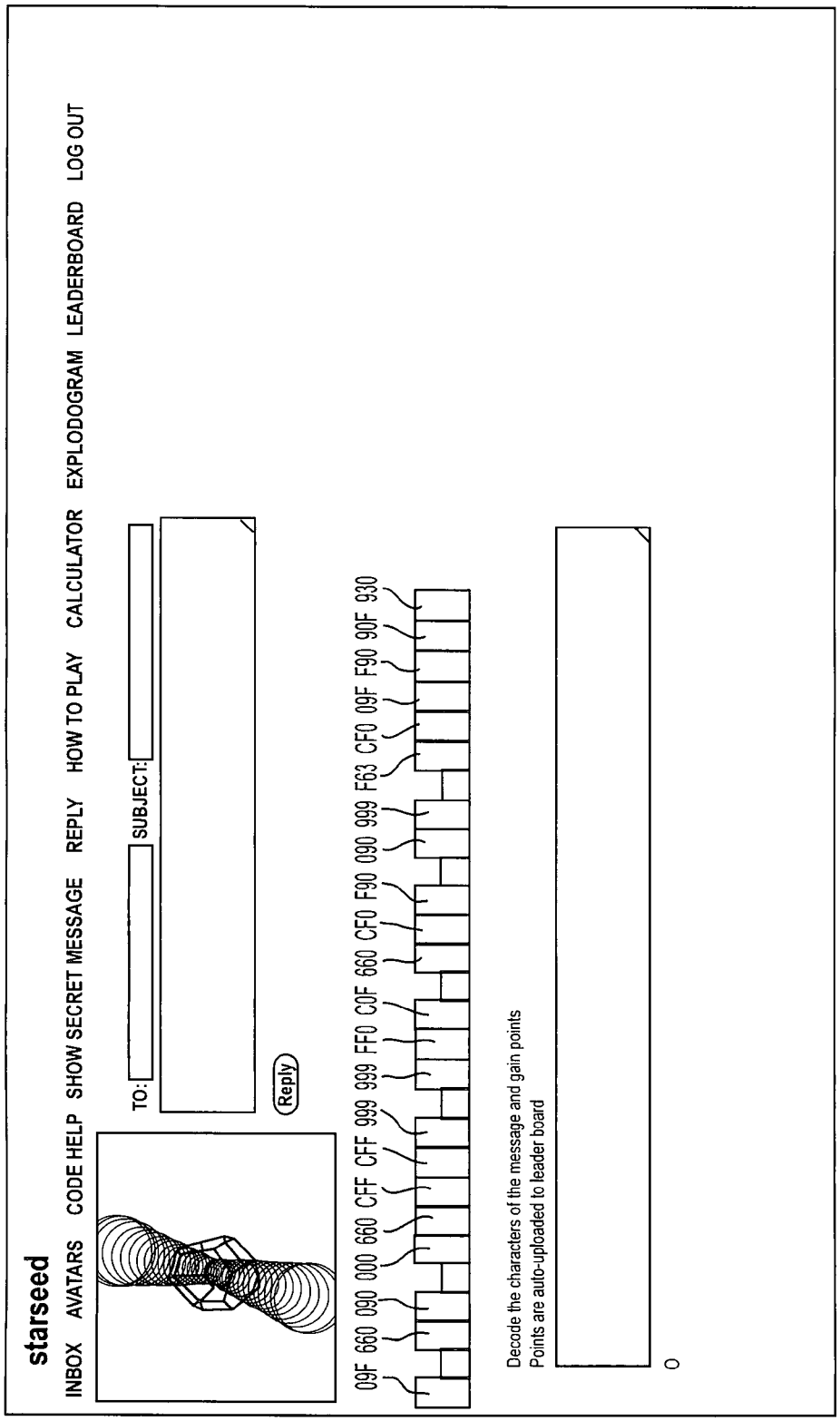
FIG. 19 shows a message page of the Prism Code game bearing a secret message.

FIG. 19—Click Show Secret Message: Click on SHOW SECRET MESSAGE and the symbol message becomes visible. (See the row of color, rectangle shaped, symbols to the left side of the page). This symbol message translates as, 'I AM HAPPY YOU ARE MY FRIEND'.

Figure 20:
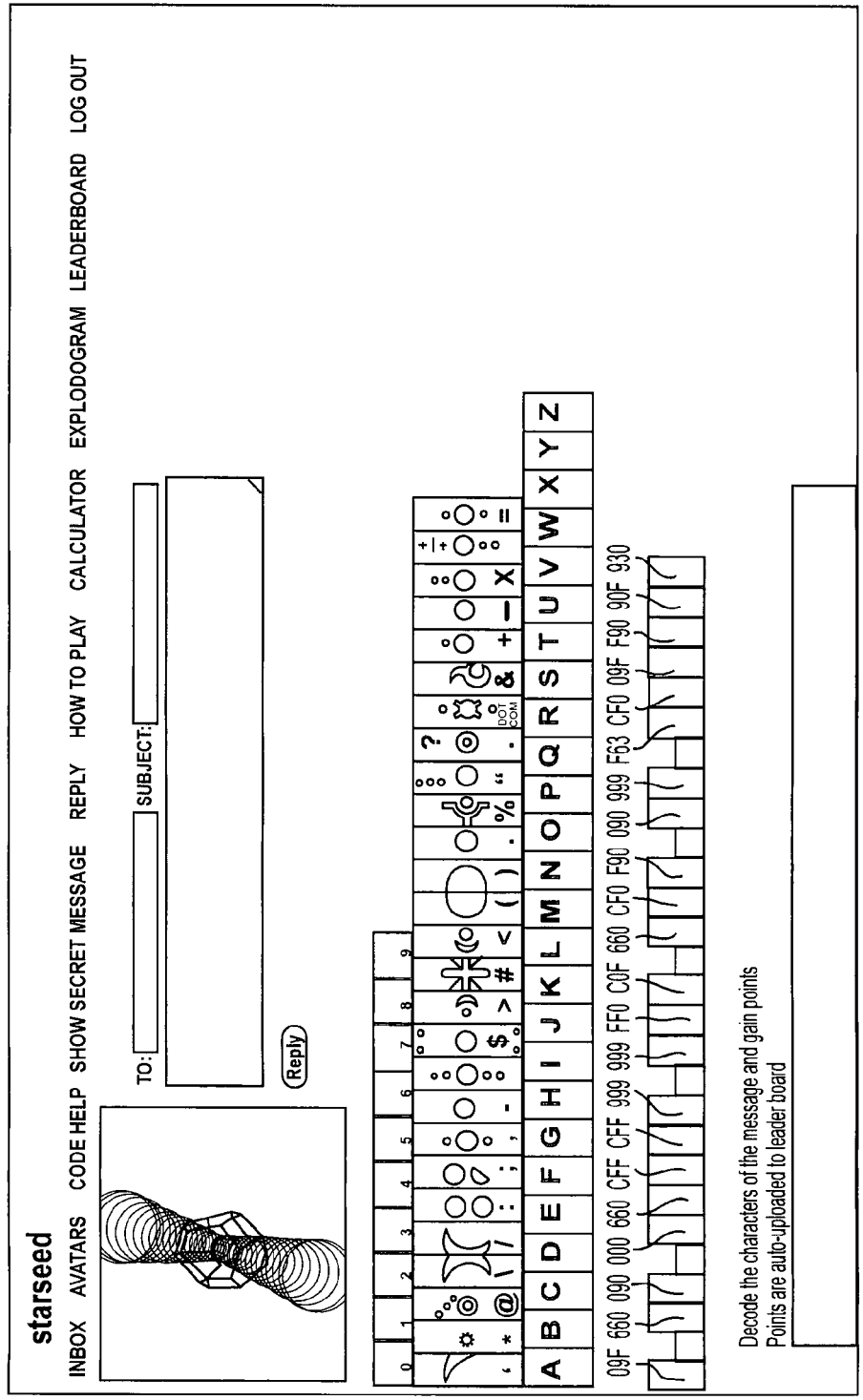
FIG. 20 shows a help decoding key table for identifying symbols of a coded Prism Code message.

FIG. 20—Optional Use of Code Help : Click on CODE HELP to make the Code Help bars visible, (if user needs it in order to help decipher the symbol message). Click on it again and the code help bars disappear. Repeat as needed.

Figure 21:
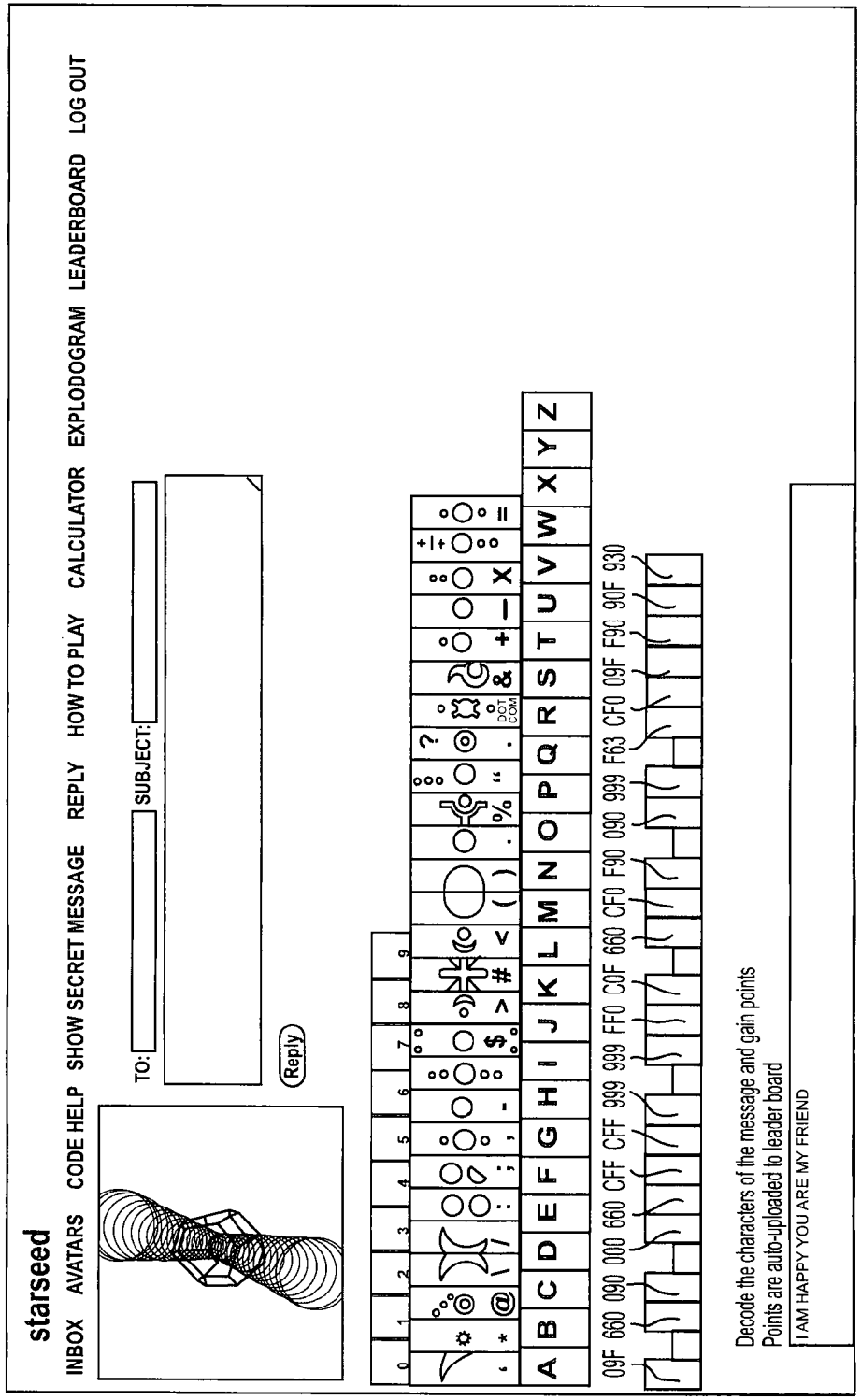
FIG. 21 shows a message page having an optional decipher message box.

FIG. 21- Optional Decipher Message Box: If desired, type the deciphered message in the white decipher message box that is toward the bottom of the page. It is not required. If a user solves a received symbol message and types it correctly into the Decipher Box, user receives points that are automatically tabulated and uploaded to the Leader Board page.

FIG. 22—Leader Board: The user with the highest monthly decoding message score is referred to as the Master Decoder and their username and score are displayed on the Leader Board page. This is the Master Decoder point system: 01—send a message to yourself, 05—send a message to a friend, 10—send a message to yourself and solve it in the Decipher Box, 20—receive a message from a friend and solve it in the Decipher Box, and 50—receive a message from Prism Code's owner and solve it in the Decipher Box.

Referring to FIGS. 23-30 use of the sound and color calculator is shown:

The following drawings are of the sound and color calculator. One can see the color number symbols, but in order to hear a symbol's sound, one must click on a symbol. Each number and arithmetic sign is assigned a symbol and a sound tone, (except for the clear symbol, a star, which is soundless). The sound is heard when one clicks on a symbol. If one is blind, one could use this calculator by ear, (listening). Numbers 0-9 and the +, −, decimal, ×, =, and divide signs have a single tone, each tone is of a different pitch. There are 10 different tones in total for the numbers and 6 different tones in total for the arithmetic signs.

Figure 23:
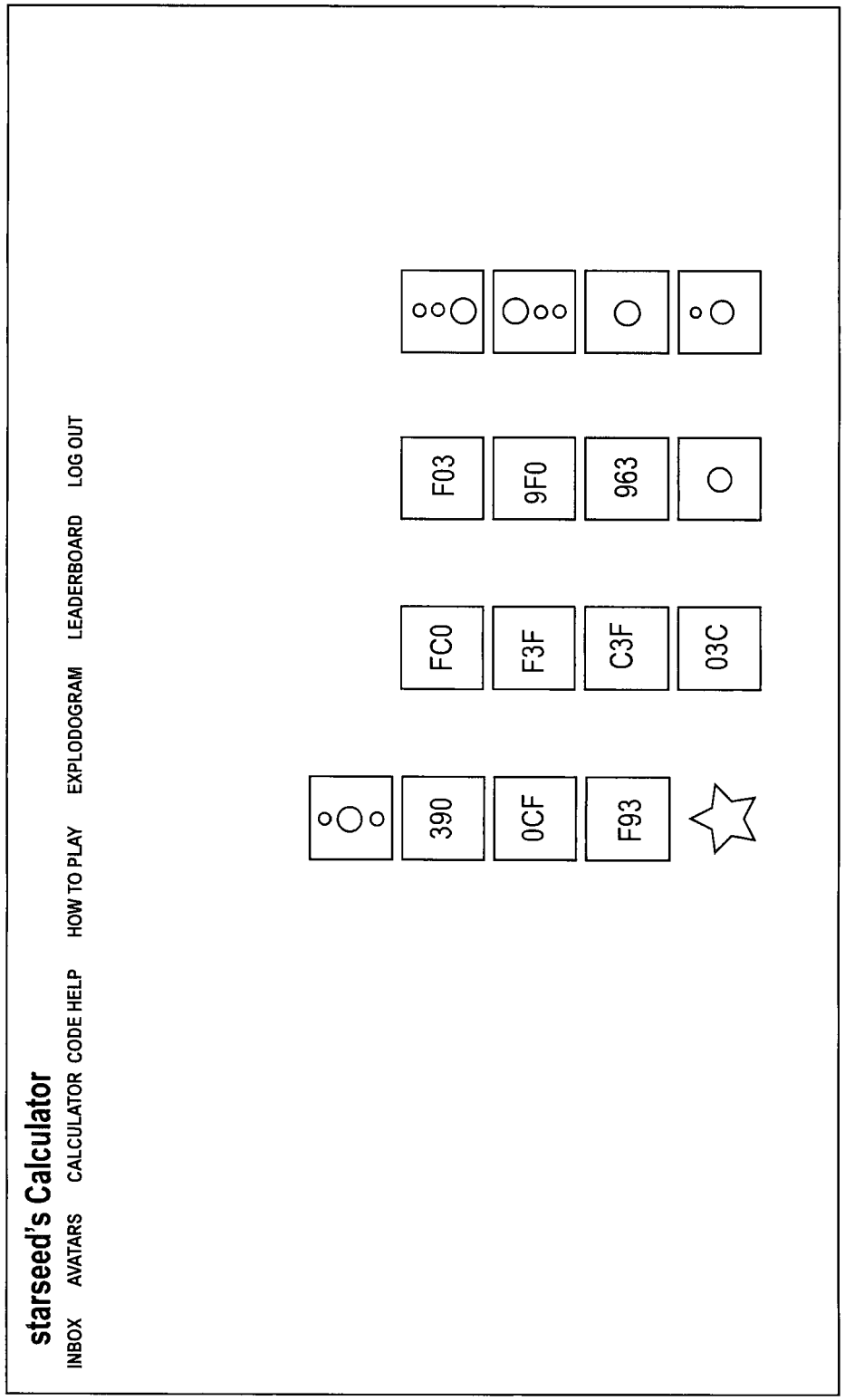
FIG. 23 shows a first screen shot of a user's color and sound calculator.

Referring to FIG. 23, a user clicks on CALCULATOR at the top of the site to go to the calculator page.

Figure 24:
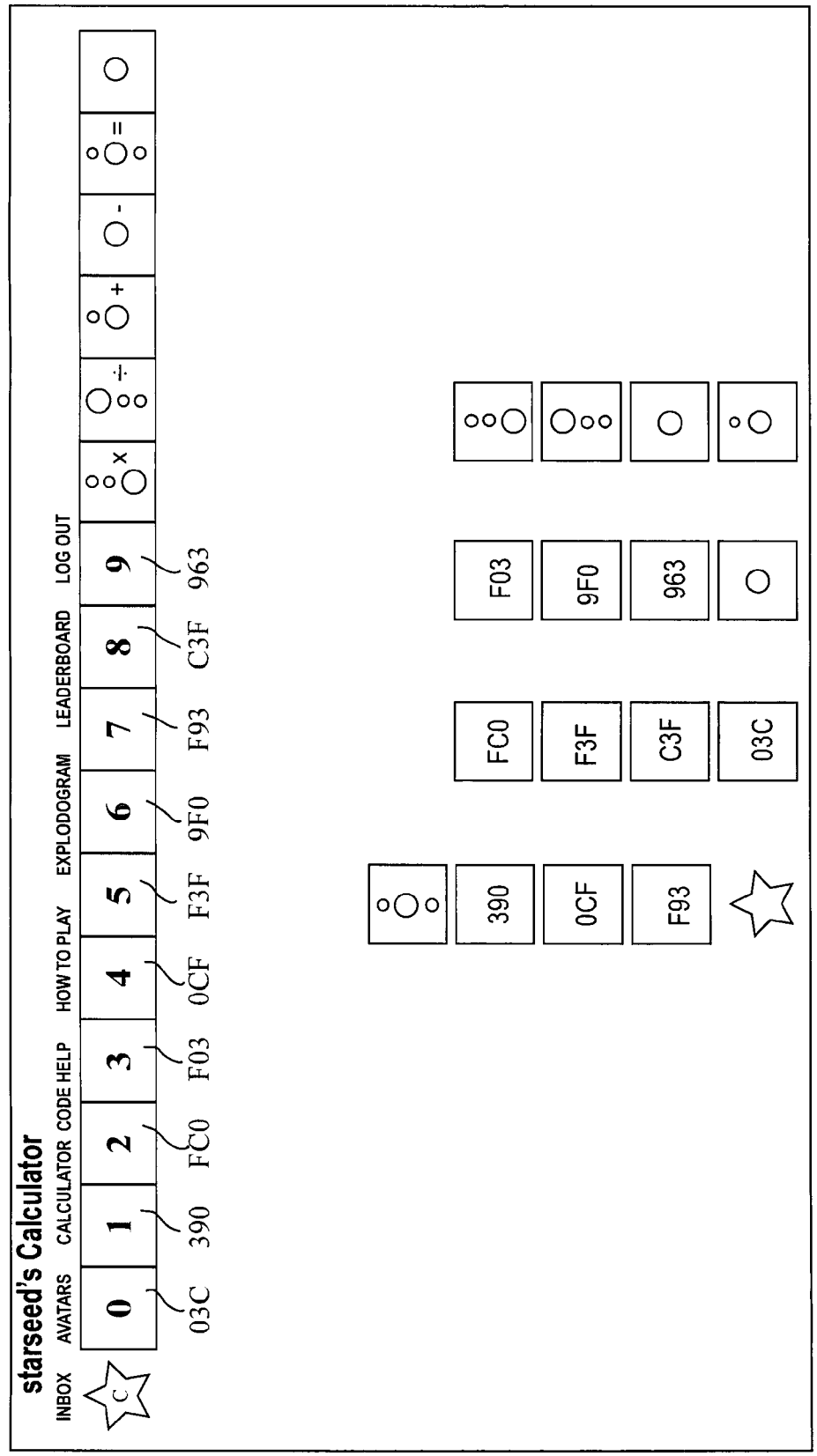
FIG. 24 shows a second screen shot of a user's color and sound calculator.

Referring to FIG. 24, in order to test the website a user clicks on CALCULATOR CODE HELP to reveal the help bar which shows the symbols for the numbers (color, square shapes), the arithmetic symbols, (yellow squares with red dots and lines for the =, +, −, ×, and divide signs, and a green square with a blue dot for the decimal point), and a purple star symbol is used for 'clear'.

Figure 25:
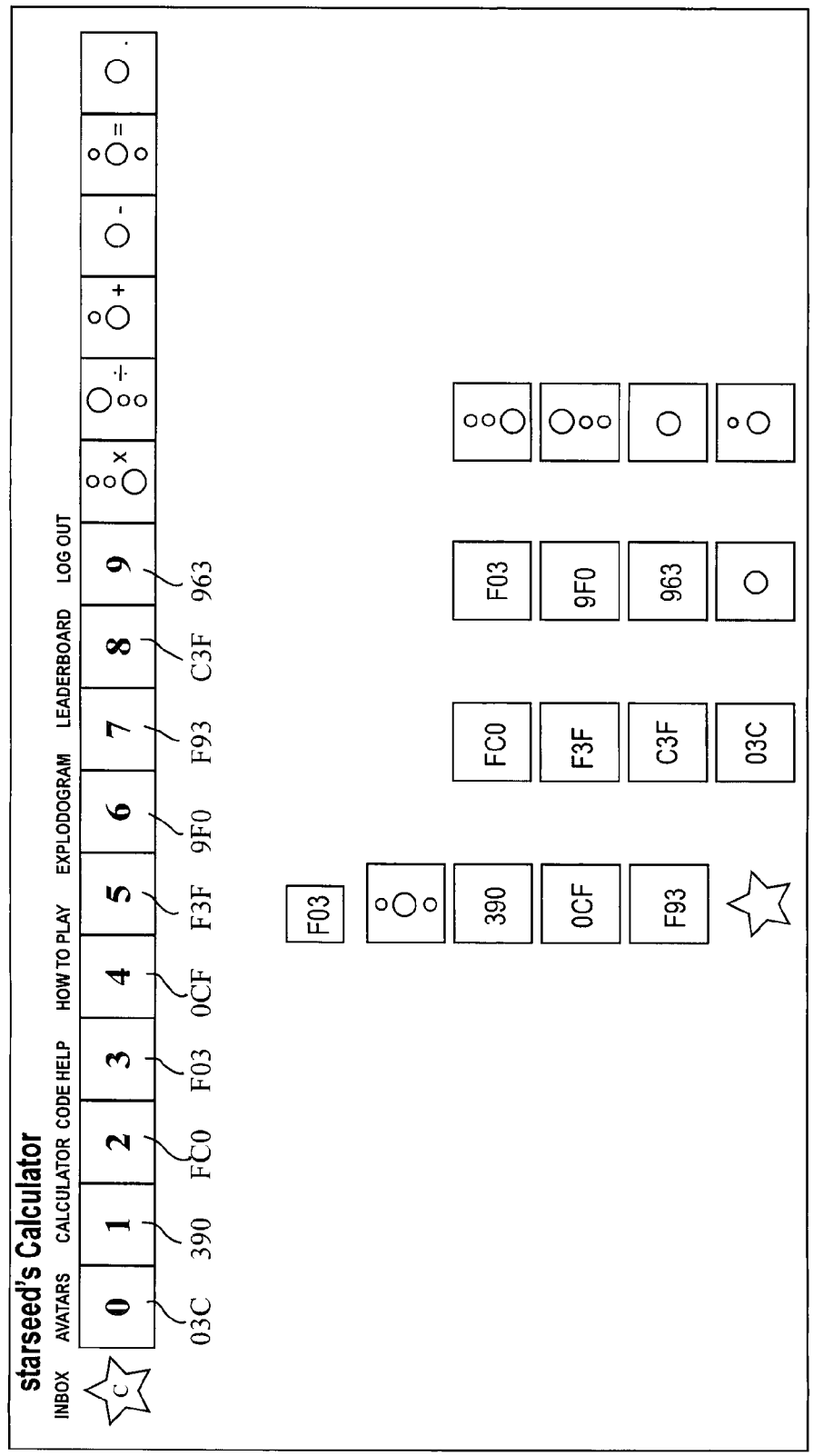
FIG. 25 shows a third screen shot of a user's color and sound calculator.

FIG. 25 demonstrates the calculation; 3+9=12. FIG. 25 shows the number 3, after a user has clicked on it. The user clicks on the red square for the number 3. The red square, pops up above the = (equals) symbol. This is the area where calculations are shown. When clicking on the red square (like all the number symbols), a brief sound/tone is heard. Unlike the number symbols, the math calculation symbols do not pop up above the equals symbol (except for the decimal symbol), only their sound tone is heard when clicked on.

Figure 26:
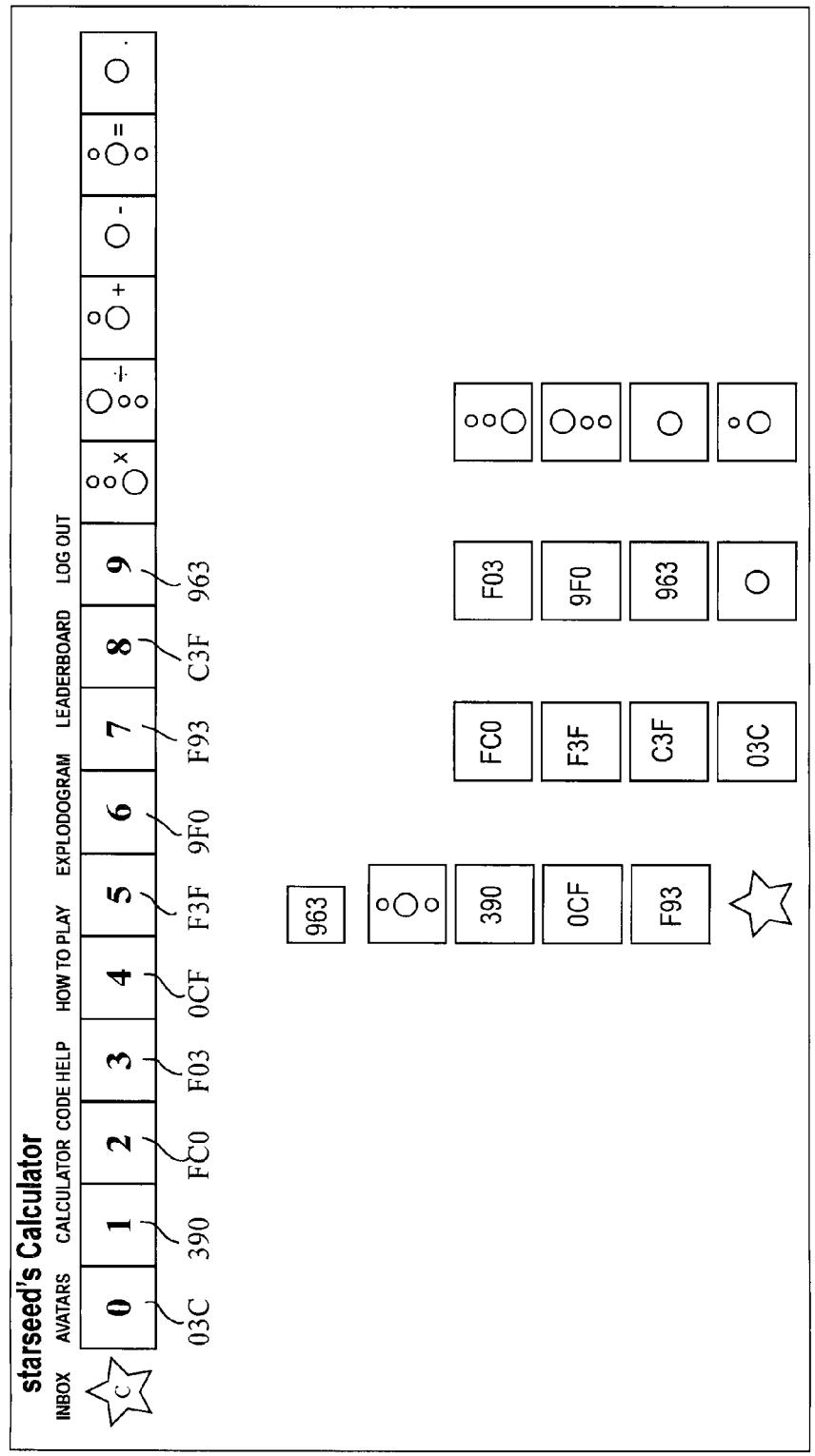
FIG. 26 shows a fourth screen shot of a user's color and sound calculator.

In FIG. 26, the symbol for + has been clicked on, followed by clicking on the brown, square, symbol for 9. The brown square symbol, (9), pops up after clicked on, replacing the red, square symbol (representative for the number 3).

Figure 27:
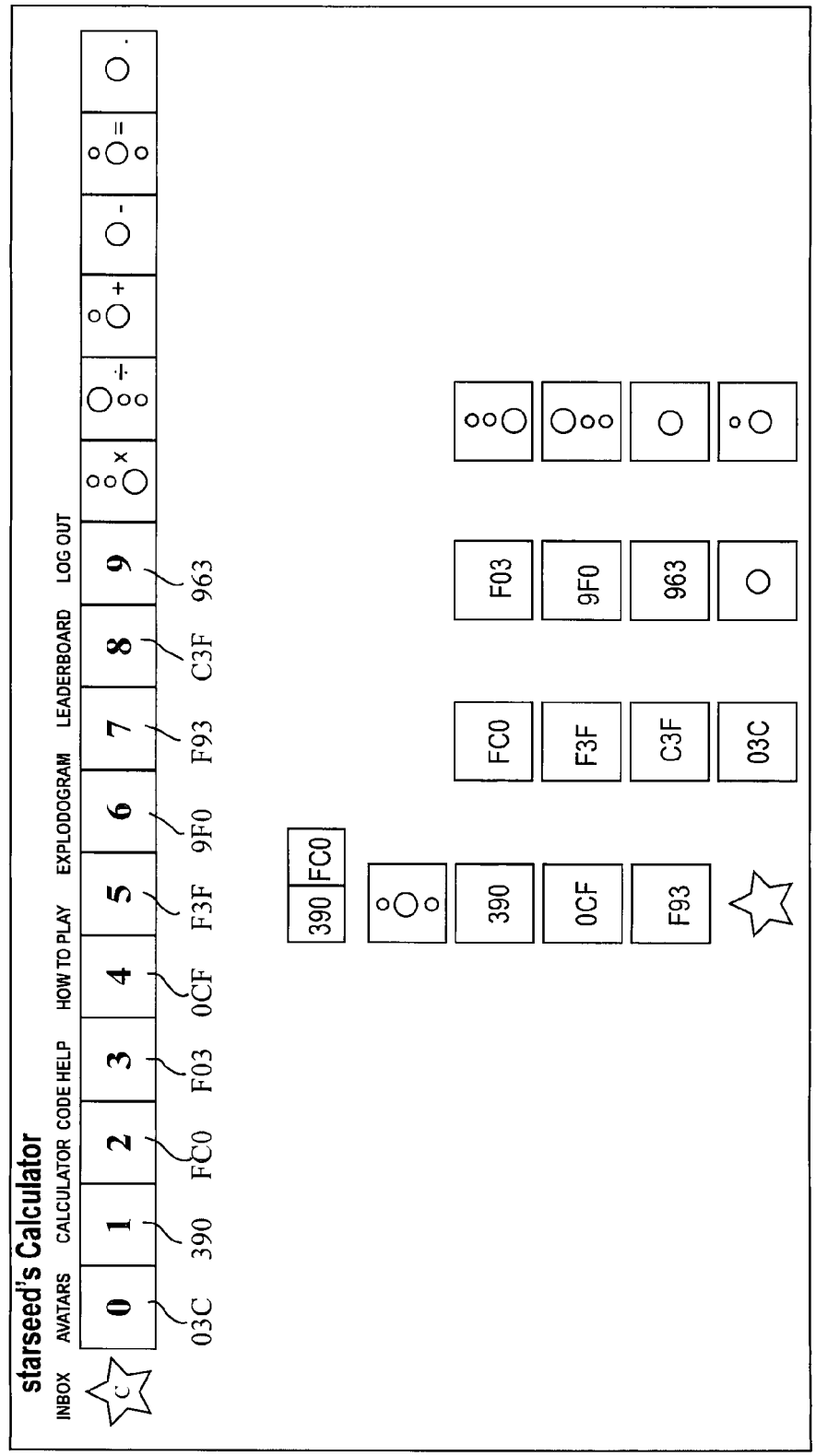
FIG. 27 shows a fifth screen shot of user's color and sound calculator.

FIG. 27, after the symbol for =, (equals) is clicked on, the result, 12, pops up, (a green square next to a yellow square). Click on the star symbol to clear. The clear symbol, like arithmetic symbols, stays in place when clicked on, (unlike the number and decimal symbols).

Figure 28:
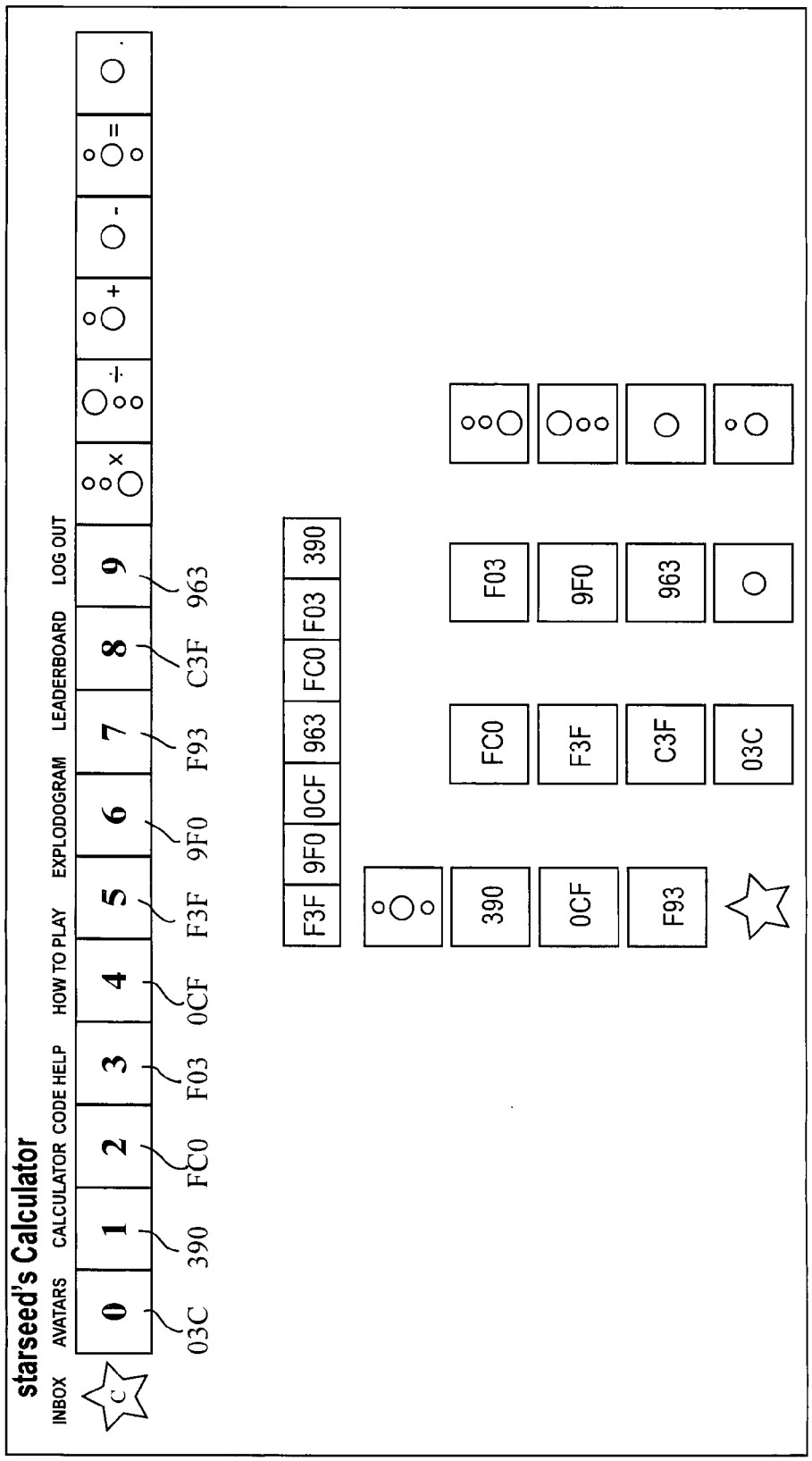
FIG. 28 shows a sixth screen shot of a user's color and sound calculator.

FIG. 28 shows a demonstration of a larger calculation: 5,649,231×3=16,947,693. FIG. 28 shows the entry of: 5,649,231.

Figure 29:
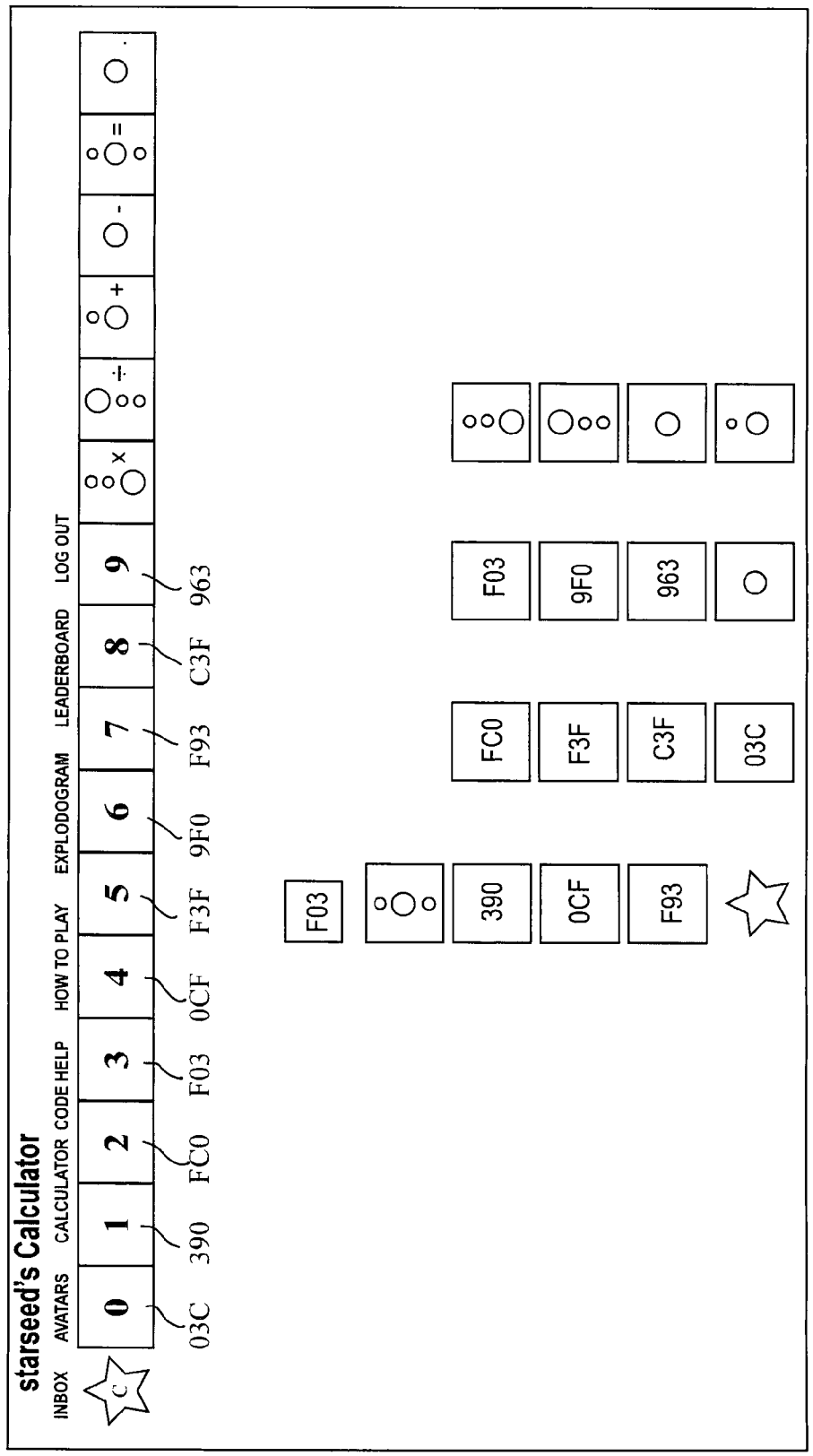
FIG. 29 shows a seventh screen shot of a user's color and sound calculator.

FIG. 29, Shows the entry of ×, (times), 3. After clicking on the times symbol, and then clicking the 3 symbol, the 5,649,231 symbol disappears and the symbol for 3 pops up.

Figure 30:
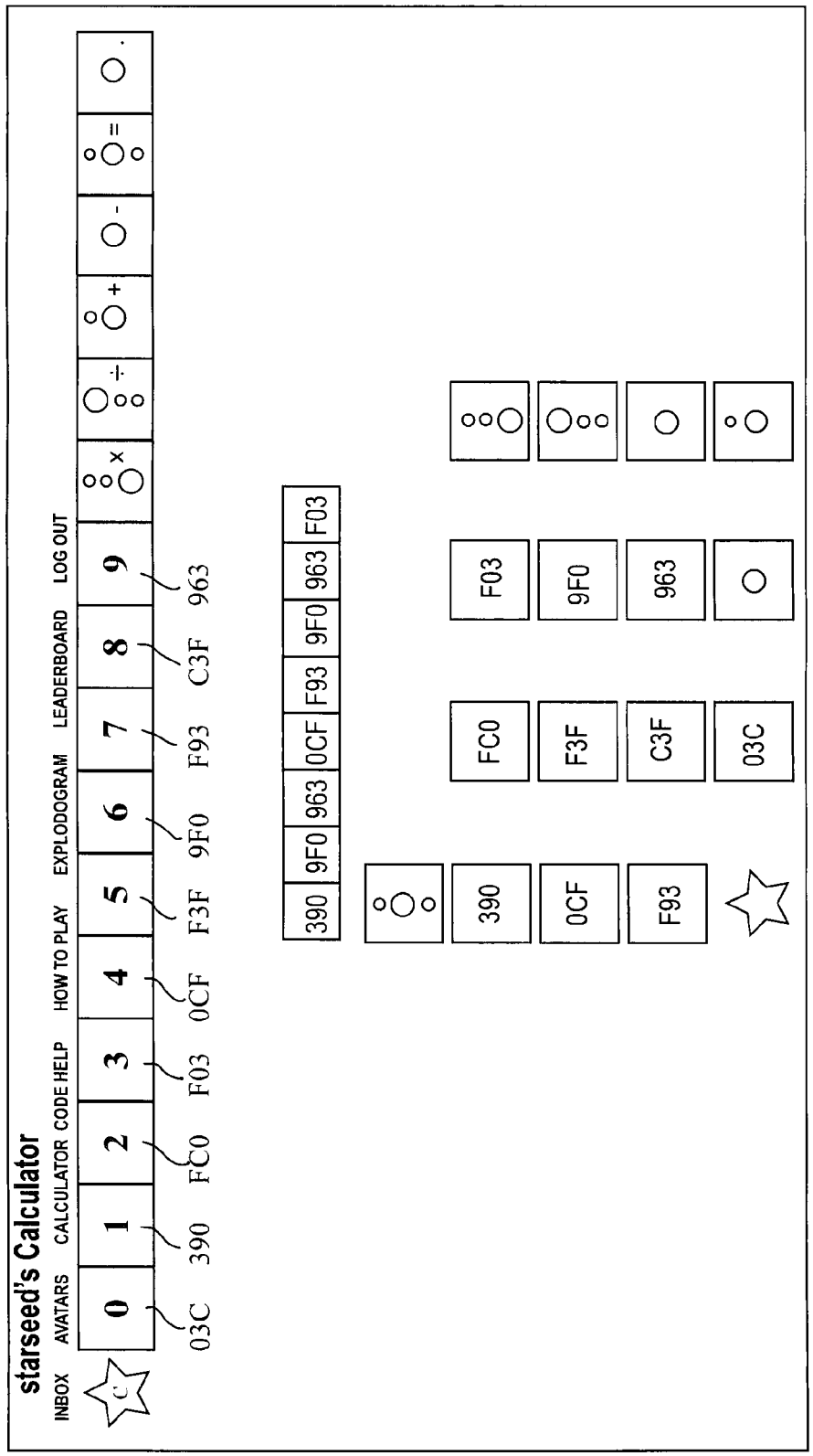
FIG. 30 shows an eighth screen shot of a user's color and sound calculator.

FIG. 30, shows the result. After clicking on the equals symbol, the result pops up in the calculations area above the equals symbol: 16,947,693. One may press the star to clear and begin a new calculation, or continue computations with the current one.

Although the present invention has been described in connection with the preferred embodiments, it is to be understood that modifications and variations may be utilized without departing from the principles and scope of the invention, as those skilled in the art will readily understand. Accordingly, such modifications may be practiced within the scope of the following claims.

The invention claimed is:

1. A method of transmitting and converting messages sent by a first person into prismatic color arrays received by a second person, the method comprising the steps of:
   the first person accessing a first computing device having a first display and a first alphanumeric input mechanism;
   the first person activating a first email program on the first computing device and entering into the first email program alphanumeric characters comprising a written message;
   performing a first computer translation of the written message, wherein each of the alphanumeric characters is replaced by a three-character code chosen from among a web safe color chart's three-character codes, the translation preserving the order of the alphanumeric characters in the written message as a specific sequence of the three-character codes;
   transmitting the sequence of three-character codes over a network;
   the second person accessing a second computing device having a second display and a second alphanumeric input mechanism;
   the second person activating a second email program on the second computing device and the second email program receiving the sequence of three-character codes; and
   the second email program converting the sequence of three-character codes into a corresponding sequence of colored icons, wherein the color of each colored icon corresponds to an individual three-character code of the web safe color chart; and
   the second email program displaying the sequence of colored icons on the second display.

2. The method of claim 1 including the steps of:
   the second person entering into the second email program a response written message comprising a sequence of alphanumeric characters;
   performing a second translation, wherein each of the alphanumeric characters of the response written message is replaced by a three-character code chosen from the web safe color chart, the second translation preserving the order of the alphanumeric characters in the response written message as a second sequence of the three-character codes; and
   transmitting the second sequence of three character codes over the network;
   the first email program receiving the second sequence of three character codes;
   the first email program convening the second sequence of three character codes into a corresponding second sequence of colored icons, wherein the color of each colored icon corresponds to the three character code of the web safe color chart; and
   the first email program displaying the second sequence of colored icon, on the first display.

3. The method of claim 1 further comprising the steps of:
   associating each colored icon with a individual sound;
   the second person selecting one colored icon from among the sequence of colored icons displayed by the display; and
   upon selection of the selected colored icon, the second computing device emitting the individual sound associated with the selected colored icon.

* * * * *